US007605811B2

(12) United States Patent
Takayama

(10) Patent No.: US 7,605,811 B2
(45) Date of Patent: Oct. 20, 2009

(54) METABALL DRAWING SYSTEM, METABALL DRAWING METHOD, AND MEMORY MEDIUM STORING METABALL DRAWING PROGRAM

(76) Inventor: Joe Takayama, 293-6, Oaza-Fukumaru, Wakamiya-Machi, Kurate-Gun, Fukuoka (JP)

( * ) Notice: Subject to any disclaimer, the term of this patent is extended or adjusted under 35 U.S.C. 154(b) by 780 days.

(21) Appl. No.: 11/297,502

(22) Filed: Dec. 9, 2005

(65) Prior Publication Data

US 2006/0126086 A1      Jun. 15, 2006

(30) Foreign Application Priority Data

Dec. 9, 2004    (JP)    ............................ P2004-357354

(51) Int. Cl.
*G06T 15/00*    (2006.01)
(52) U.S. Cl. .................... 345/418; 345/619; 358/1.9; 358/3.23; 463/30
(58) Field of Classification Search ................. 345/418, 345/619; 358/1.9, 3.23; 463/30
See application file for complete search history.

(56) References Cited

U.S. PATENT DOCUMENTS 6,894,688 B2 *    5/2005    Tsuda et al. ................. 345/419

7,104,890 B2 *    9/2006    Tsuda et al. ................... 463/30

OTHER PUBLICATIONS

Blinn, A Generalization of Algebraic Surface Drawing, ACM Transaction on Graphics, Jul. 1982, pp. 235-256.*

* cited by examiner

*Primary Examiner*—Phu K Nguyen
(74) *Attorney, Agent, or Firm*—Rader, Fishman & Grauer PLLC

(57) ABSTRACT

In a metaball drawing system, first and second metaballs are represented by first and second density distributions, and a threshold band is set with respect to the first and second density distributions. It is determined whether a pixel on a screen is included in the first metaball. When the pixel is included in the first metaball, a first density at the pixel is calculated based on the first density distribution. When the first density falls within the threshold band, a first luminance value is set in the pixel based on the first density. Then, it is determined whether the pixel is included in the second metaball. When the pixel is included in the second metaball, a second density at the pixel is calculated based on a density distribution combined by the first and second density distributions. When the second density falls within the threshold band, a second luminance value is set in the pixel based on the second density.

18 Claims, 39 Drawing Sheets

| $P_{11}$ | $P_{12}$ | $P_{13}$ | | $P_{1(v-2)}$ | $P_{1(v-1)}$ | $P_{1V}$ |
|---|---|---|---|---|---|---|
| $P_{21}$ | $P_{22}$ | $P_{23}$ | | $P_{2(v-2)}$ | $P_{2(v-1)}$ | $P_{2V}$ |
| | | | | | | |
| $P_{(u-1)1}$ | $P_{(u-1)2}$ | $P_{(u-1)3}$ | | $P_{(u-1)(v-2)}$ | $P_{(u-1)(v-1)}$ | $P_{(u-1)V}$ |
| $P_{U1}$ | $P_{U2}$ | $P_{U3}$ | | $P_{U(v-2)}$ | $P_{U(v-1)}$ | $P_{UV}$ |

22

$D_3$ $D_4$ $D_5$

METABALL DRAWING SYSTEM, METABALL DRAWING METHOD, AND MEMORY MEDIUM STORING METABALL DRAWING PROGRAM

BACKGROUND OF THE INVENTION

1. Field of the Invention

The present invention generally relates to a computer graphics, and more particularly relates to a metaball drawing system using metaballs, which may be called "Blob" or "Blobby". Also, the present invention relates to a metaball drawing method executed in such a metaball drawing system, and a memory medium storing a metaball drawing program for executing such a metaball drawing method.

2. Description of the Related Art

A concept of a metaball drawing method has been contributed by researchers of OSAKA UNIVERSITY in 1980s to draw and display a 2-dimensional image or a 3-dimensional image by smoothly curved lines (i.e., iso-density lines) or smoothly curved surfaces (i.e., iso-density surfaces). Also, a similar concept has been proposed in an article by James F. Blinn; entitled "A Generalization of Algebraic Surface Drawing"; ACM Transactions on Graphics (TOG), Volume 1, Issue 3, (July 1982), P. 235-256, and this drawing method is called "Blob" or "Blobby Model".

A metaball is represented by a density distribution. For example, when two metaballs are defined on the screen of the monitor so as to partially overlap each other, the density distributions of the two metaballs are combined with each other. Then, a threshold or slice level is set with respect to the combined density distribution, and it is determined whether a pixel on the screen is included in the two metaballs. When the pixel is not included in the metaballs, a background luminance value (e.g. a black level) is set in the pixel concerned.

On the other hand, when the pixel is included in the metaballs, a density at the pixel concerned is calculated based on the combined density distribution. Then, it is determined whether the calculated density is above the threshold or slice level. When the calculated density is above the threshold or slice level, a given luminance value is set in the pixel concerned. When the calculated density is below the threshold or slice level, a setting of the background luminance value is given to the pixel concerned.

By processing all the pixels on the screen as stated above, an image is drawn based on the two metaballs. When the image is drawn as a 2-dimensional image, a contour of the image is defined by a closed iso-density line. Also, when the image is drawn as a 3-dimensional image, a contour of the image is defined by an iso-density surface. In either event, in the conventional metaball drawing method, the contour line or contour surface of the image is only drawn, and thus it is impossible to generate textures, patterns and so on in the interior area of the closed iso-density line or on the iso-density surface. Namely, the conventional metaball drawing method fails in drawing a complex and attractive image, as stated in detail hereinafter.

SUMMARY OF THE INVENTION

Therefore, a main object of the present invention is to provide a metaball drawing system which can draw a complex and attractive image in comparison with the conventional metaball drawing method.

Another object of the present invention is to provide a metaball drawing method which is executed in the metaball drawing system.

Yet another object of the present invention is provide a memory medium storing a metaball drawing program for executing the metaball drawing method.

In accordance with a first aspect of the present invention, there is provided a metaball drawing system in which an achromatic image is drawn and displayed. In this metaball drawing system, a metaball definition system defines first and second metaballs with respect to a screen, and the respective first and second metaballs are represented by first and second density distributions. A threshold setting system sets a threshold band with respect to the first and second density distributions. A first metaball determination system determines whether a pixel on the screen is included in the first metaball. When it is determined that the pixel is included in the first metaball by the first metaball determination system, a first density calculation system calculates a first density at the pixel based on the first density distribution, and a first threshold determination system determines whether the first density falls within the threshold band. When it is determined that the first density falls within the threshold band by the first threshold determination system, a first luminance-value setting system sets a first luminance value in the pixel based on the first density. After it is determined whether the pixel is included in the first metaball, a second metaball determination system determines whether the pixel is included in the second metaball. When it is determined that the pixel is included in the second metaball by the second metaball determination system. A second density calculation system calculates a second density at the pixel based on a density distribution, which is combined by the first and second density distributions, and a second threshold determination system determines whether the second density falls within the threshold band. When it is determined that the second density falls within the threshold band by the second threshold determination system, a second luminance-value setting system sets a second luminance value in the pixel based on the second density.

Preferably, in the first aspect of the present invention, the metaball drawing system is provided with a pixel development system in which the pixel is developed on the screen based on any one of the first and second luminance values.

In the first aspect of the present invention, any one of the first and second luminance values may be set as binary data by a corresponding luminance-value setting system. Optionally, any one of the first and second luminance values maybe set as gradation data based on a density conversion function by a corresponding luminance-value setting system. Also, one of the first and second density distributions may be defined as a negative density distribution.

In accordance with a second aspect of the present invention, there is provided a metaball drawing system in which a color image is drawn and displayed. In this metaball drawing system, a metaball definition system defines first and second metaballs with respect to a screen, and the respective first and second metaballs are represented by first and second density distributions. A first set of first red data, first green data and first blue data is assigned to the first metaball, and a second set of second red data, second green data and second blue data is assigned to the second metaball. A threshold setting system sets a threshold band with respect to the first and second density distributions. A first metaball determination system determines whether a pixel on the screen is included in the first metaball. When it is determined that the pixel is included in the first metaball by the first metaball determination system, a first density calculation system calculates a first density at the pixel based on the first density distribution. A first threshold determination system determines whether the first density falls within the threshold band. When it is determined that the first density falls within the threshold band by the first threshold determination system, a first color density calculation system calculates a first red density, a first green density and a first blue density from the first set of first red data, first green data and first blue data based on the first density. A first luminance-value setting system sets a first luminance value in the pixel based on the first red density, the first green density and the first blue density. A second metaball determination system determines whether the pixel is included in the second metaball after it is determined whether the pixel is included in the first metaball. When it is determined that the pixel is included in the second metaball by the second metaball determination system, a second density calculation system calculates a second density at the pixel based on a density distribution, which is combined by the first and second density distributions. A second threshold determination system determines whether the second density falls within the threshold band. When it is determined that the second density falls within the threshold band by the second threshold determination system, a second color density calculation system that calculates a second red density, a second green density and a second blue density from the first set of first red data, first green data, and first blue data and the second set of second red data, second green data and second blue data based on the second density. A second luminance-value setting system sets a second luminance value in the pixel based on the second red density, the second green density and the second blue density.

Preferably, in the second aspect of the present invention, the metaball drawing system is provided with a pixel development system in which the pixel is developed on the screen based on any one of the first and second luminance values.

BRIEF DESCRIPTION OF THE DRAWINGS

The above objects and other objects will be more clearly understood from the description set forth below, with reference to the accompanying drawings, wherein:

FIG. 11 is a conceptual view of a bitmap memory contained in a system control unit of the metaball drawing system of FIG. 10;

DESCRIPTION OF THE PREFERRED EMBODIMENTS

Before description of the preferred embodiments of the present invention, for better understanding of the present invention, with reference to FIG. 1, FIGS. 2A to 2C, FIG. 3, FIGS. 4A and 4B, FIGS. 5A and 5B, FIG. 6, FIGS. 7A and 7B, and FIGS. 8A to 8D, a prior art metaball drawing method will be now explained.

Figure 1:
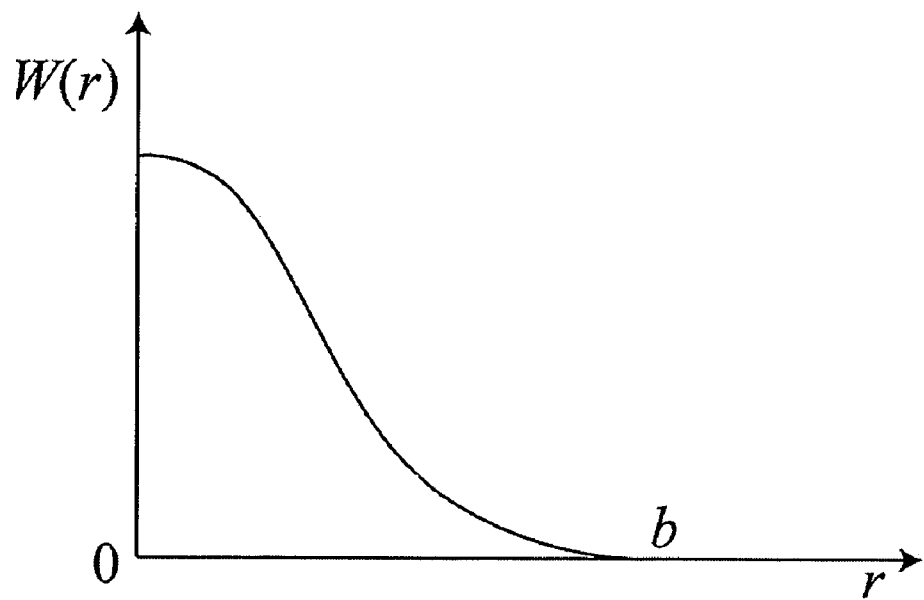
FIG. 1 is an explanatory view for explaining a concept of a metaball.

In the metaball drawing method, for example, a metaball, which is represented by a density distribution function $W(r)$ as shown in FIG. 1, is used, and the density distribution function $W(r)$ may be defined as follows:

$$d[1-3(r/b)^2] \quad (0 \leq r \leq b/3)$$

$$W(r) = 1.5d(1-r/b)^2] \quad (b/3 \leq r \leq b/b)$$

$$0 \quad (b \leq r)$$

Herein: r is a distance measured from a center of the metaball (O); d is a weight of a density; and b is a radius of the metaball (density distribution).

This density distribution function $W(r)$ is disclosed in an article by Hirai, M., Nshimura, H., Kawata, T., Shirakawa, I., Ohmura, K. ; "An Object Modeling with Distribution Function and a method for Efficient Image Creation"; ITEJ Technical Report, IPD81-5, VVI 60-5, IPA 67-5, 1983, Pp. 21-26, 1983.

Also, the density distribution function $W(r)$ may be defined as follows:

$$W(r) = [[\cos((r/b)\pi) + 1]/2]P$$

Herein: r is a distance measured from a center of the metaball (O); b is a radius of the metaball (density distribution); and p is a value of the density, which may be a negative value.

In this field, other various density distribution functions are proposed, and it is possible to optionally select and use one or more than one of the various density distribution functions in the metaball drawing method. Also, although the metaball usually features a sphere shape, it is possible to give another shape, such as a cylindrical shape, a triangle shape, a square shape, a pentagonal shape, a hexagonal shape or the like to the metaball.

Figure 2A:
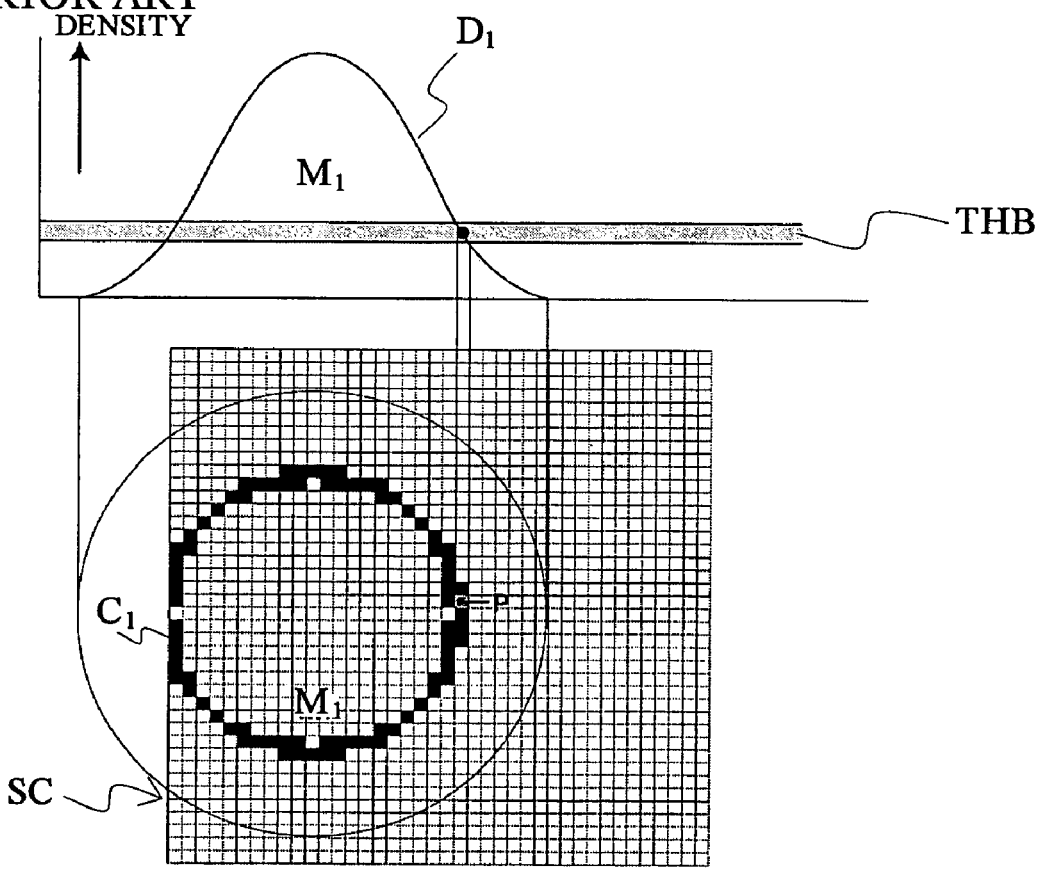
FIGS. 2A, 2B and 2C are explanatory views for explaining a concept of a prior art metaball drawing method when a 2-dimensional image is drawn and displayed on a screen of a monitor.
Figure 2B:
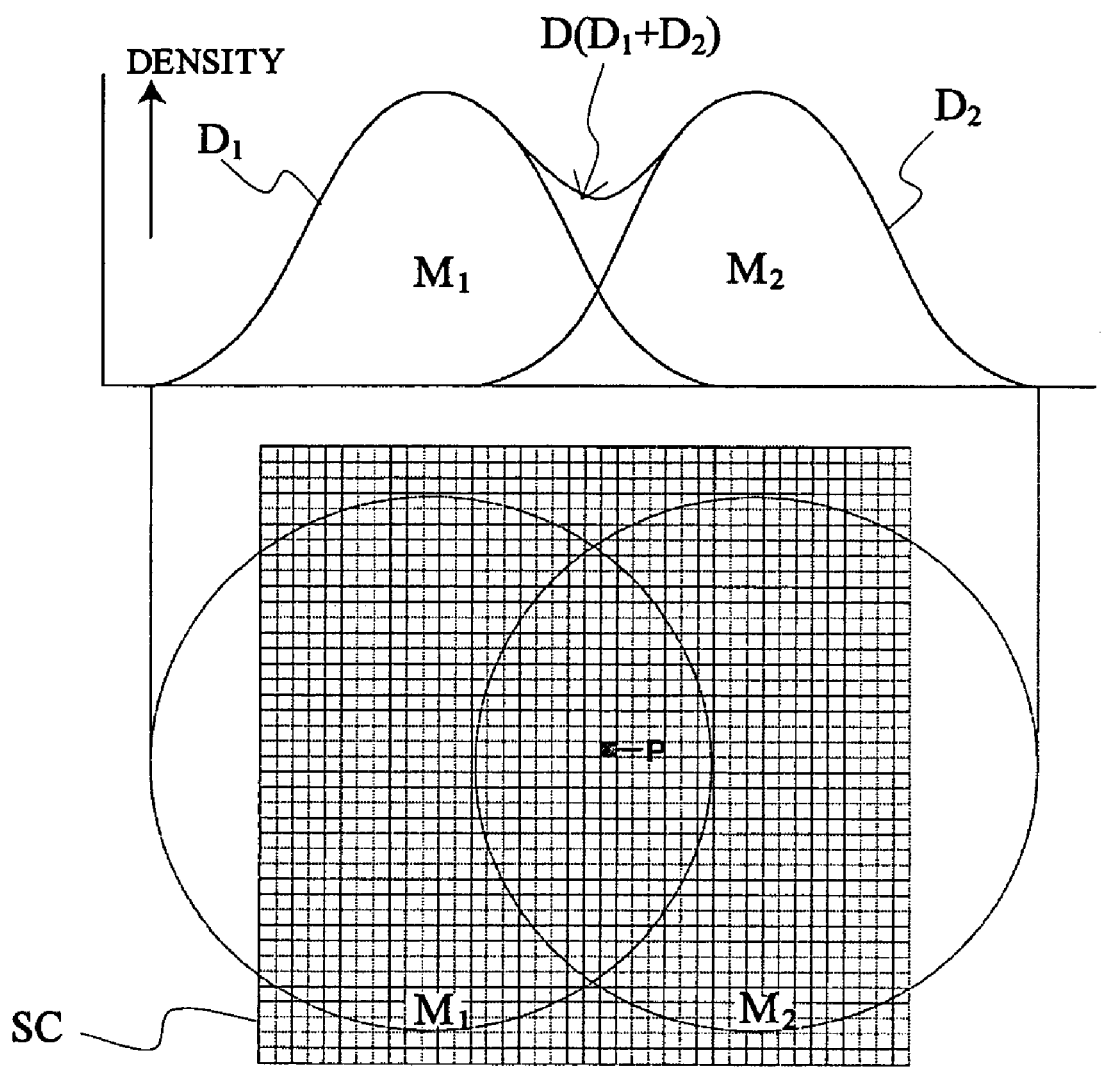
Figure 2C:
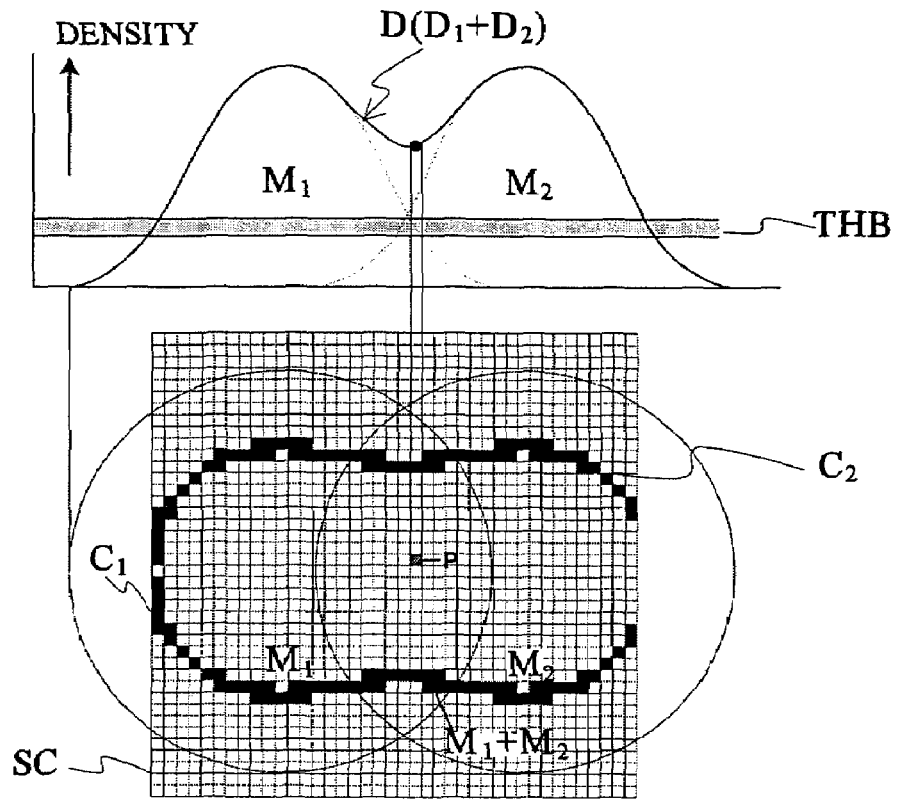

Referring to FIGS. 2A, 2B and 2C, for example, it is explained how a binary image is drawn by using the prior art metaball method.

In FIG. 2A, reference SC indicates a part of a screen of a monitor. A metaball $M_1$ having a density distribution $D_1$ is defined on the screen SC, and a threshold band THB is set with respect to the density distribution $D_1$.

In the prior art metaball drawing method, it is determined whether a pixel on the screen SC is included in the metaball $M_1$. When the pixel is not included in the metaball $M_1$, a background luminance value is set in the pixel. Note, in this example, the background luminance-value is a white level.

When the pixel is included in the metaball $M_1$, a density of the pixel is calculated based on the density distribution $D_1$. Then, it is determined whether the calculated density falls within the threshold band THB. When the calculated density does not fall within the threshold band THB, the background luminance value is set in the pixel. When the calculated density falls within the threshold band THB, a given luminance value is set in the pixel.

By processing all the pixels on the screen SC as mentioned above, a circle $C_1$ is drawn and displayed as a 2-dimensional binary image on the screen SC, as shown in FIG. 2A. Note, in FIG. 1A, one of the pixels for displaying the circle $C_1$ is representatively indicated by reference P.

As shown in FIG. 2B, when a metaball $M_2$ having a density distribution $D_2$ (which is substantially the same as density distribution $D_1$) is further defined on the screen SC so as to partially overlap with the metaball $M_1$, the density distributions $D_1$ and $D_2$ are combined with each other to thereby produce a density distribution, generally indicated by reference D.

In this case, the pixel P on the screen SC is included in the overlapped area of both the metaballs $M_1$ and $M_2$, and a density of the pixel is calculated based on the combined density distribution D. As is apparent from FIG. 2C, the calculated density of the pixel P is above the threshold band THB, and thus the background luminance value is set in the pixel P. Therefore, the circle $C_1$ fuses partially with a circle 2 derived from the metaball $M_2$, so that only an outline of a gourd-like shape is drawn and displayed as a 2-dimensional binary image on the screen SC, as shown in FIG. 2C.

In short, by using the prior art metaball drawing method, the circles $C_1$ and $C_2$ are partially fused with each other, so that the outline of the gourd-like shape is drawn by a smoothly curved line or iso-density line.

Figure 3:
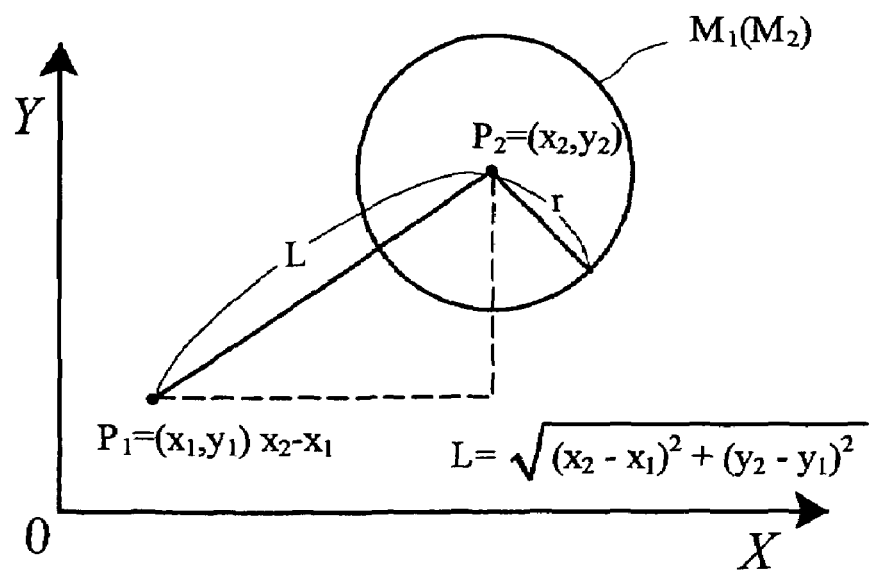
FIG. 3 is an explanatory view for explaining how it is determined whether a pixel is included in the metaball.

With reference to FIG. 3, an explanation is made how it is determined whether a pixel on the screen SC is included in the metaball ($M_1$, $M_2$).

In order to determine whether a pixel on the screen SC is included in the metaball ($M_1$, $M_2$), an X-Y coordinate system is defined on the screen SC, and a distance L between the pixel and the center of the metaball ($M_1$, $M_2$) is calculated. In FIG. 3, $P_1=(x_1, y_1)$ represents X-Y coordinates of the pixel, and $P_2=(x_2, y_2)$ represents X-Y coordinates of the center of the metaball ($M_1$, $M_2$). The calculation of the distance L is carried out based on the Pythagorean theorem, and the distance L is compared with a radius r of the metaball ($M_1$, $M_2$). Namely, when the distance L is longer than the radius r, it is determined that the pixel is not included in the metaball ($M_1$, $M_2$). When the distance L is equal to or shorter than the radius r, it is determined that the pixel is included in the metaball ($M_1$, $M_2$).

Figure 4A:
FIGS. 4A and 4B are explanatory views for explaining another concept of the prior art metaball drawing method when a 3-dimensional image is drawn and displayed on a screen of a monitor.
Figure 4B:
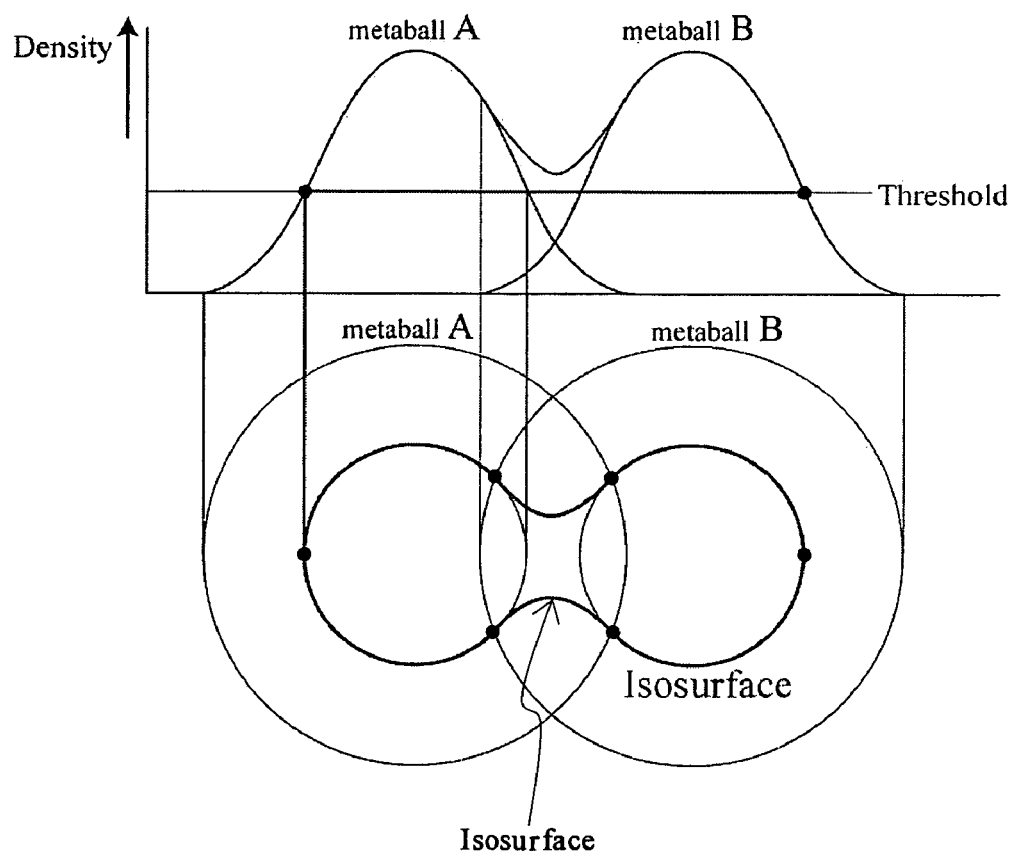

In the aforesaid example shown in FIGS. 2A to 2C, although the image is 2-dimensionally drawn and displayed on the screen SC of the monitor, the prior art metaball drawing method can be rather advantageously used to 3-dimensionally draw and display an image on the screen of the monitor, as shown in FIGS. 4A and 4B.

In FIG. 4A, respective three pairs of spheres are 3-dimensionally drawn and displayed on the screen at a rightmost position, an intermediate position and a leftmost position on a screen of a monitor in accordance with the metaball drawing method. The pair of spheres displayed at the rightmost side are separated from each other; the pair of spheres displayed at the intermediate position slightly partially fuse each other; and the pair of spheres displayed at the leftmost position further partially fuse with each other. Namely, FIG. 4A shows a state in which the spheres gradually approach each other so as to be partially fuse with each other just as two mercury drops. According to the prior art metaball drawing method, it is possible to smoothly draw and display the fused area between the spheres, as shown in FIG. 4A.

In FIG. 4B, a metaball A represents a density distribution for generating one of the spheres in pair, and a metaball B represents a density distribution for generating the other sphere. Note, the density distributions of the metaballs A and B are substantially the same as each other. In order to draw and display the pair of spheres shown at the leftmost position of FIG. 4A, both the metaballs A and B overlap with each other to produce a combined density distribution, and a threshold or slice level is set with respect to the combined density distribution, as shown in FIG. 4B. Namely, under these conditions, according to the metaball drawing method, an iso-density surface (isosurface) is generated as represented by a closed curved line in FIG. 4B, and thus it is possible to smoothly draw and display the partially fused spheres as a 3-dimensional image, as shown at the leftmost position of FIG. 4A.

Also, in the prior art metaball drawing method, it is possible to optionally vary a width of the threshold band THB (FIGS. 2A to 2C).

Figure 5A:
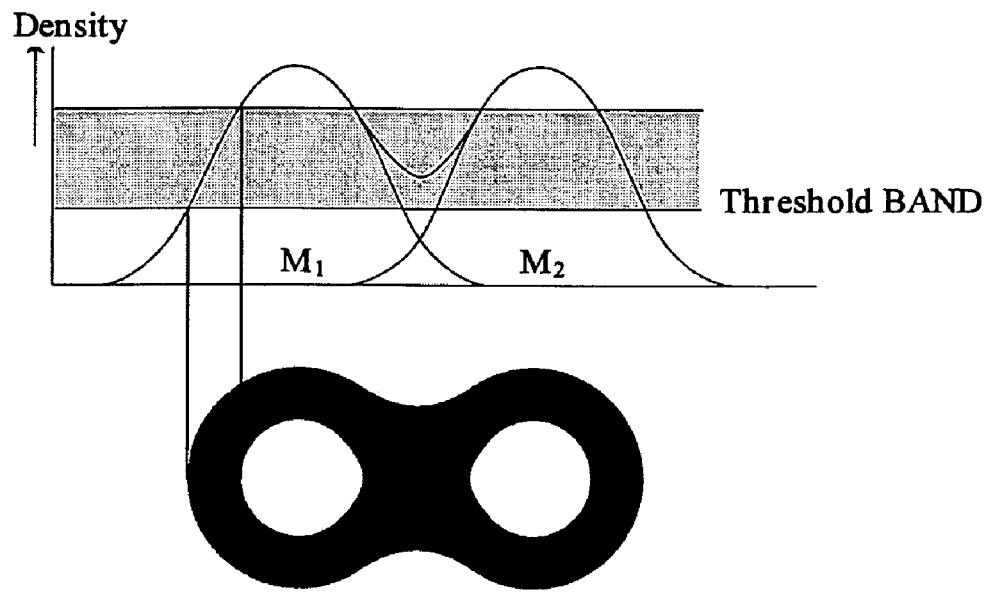
FIG. 5A is an explanatory view for explaining a generation of a 2-dimensional image which is obtained by varying a width of a threshold band to be set with respect to the metaballs.

In FIG. 5A in which the metaballs $M_1$ and $M_2$ are defined on the screen in substantially the same manner as in FIGS. 2B and 2C, the width of the threshold band is wider than that of the threshold band THB of FIGS. 2B and 2C. In this case, a 2-dimensional image is drawn and displayed on the screen in accordance with the width of the threshold band, as shown in FIG. 5A.

Figure 5B:
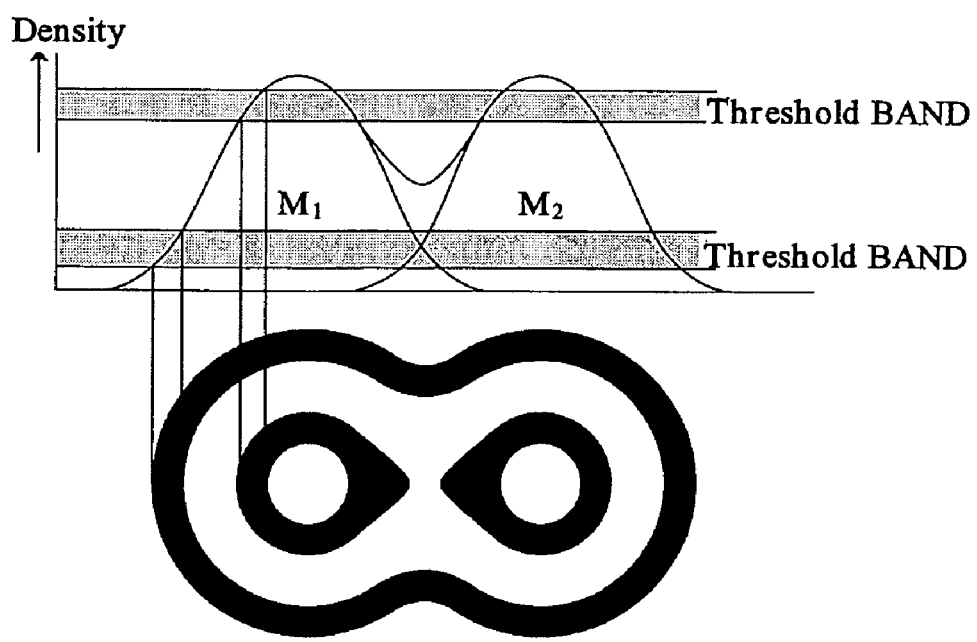
FIG. 5B is an explanatory view for explaining a generation of a 2-dimensional image which is obtained by setting two threshold bands with respect to the metaballs.

As shown in FIG. 5B in which the metaballs $M_1$ and $M_2$ are defined on the screen in substantially the same manner as in FIGS. 2B and 2C, it is possible to optionally set two thresholds with respect to the metaballs $M_1$ and $M_2$. In this case, a 2-dimensional image is drawn and displayed on the screen in accordance with the setting of the two threshold bands, as shown in FIG. 5B.

In short, by varying the width of the threshold band, and by setting a plurality of threshold bands with respect to the metaballs $M_1$ and $M_2$, it is possible to generate various images.

Figure 6:
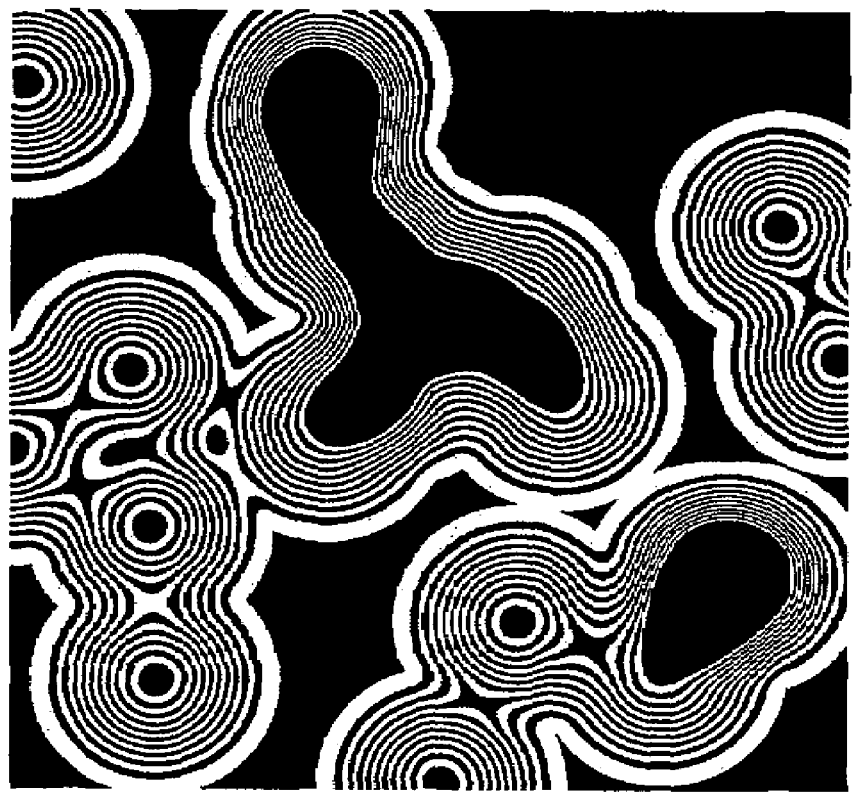
FIG. 6 is an explanatory view for explaining a generation of a 2-dimensional image which is obtained by using various metaballs and by setting a plurality of threshold bands with respect to each of the metaballs.

In the prior art metaball drawing method, a plurality of metaballs may be defined on the screen of the monitor, and a plurality of threshold bands may be set with respect to each of the metaballs. In this case, it is possible to obtain a 2-dimensional image just as a contour map, as shown in FIG. 6 by way of example.

Figure 7A:
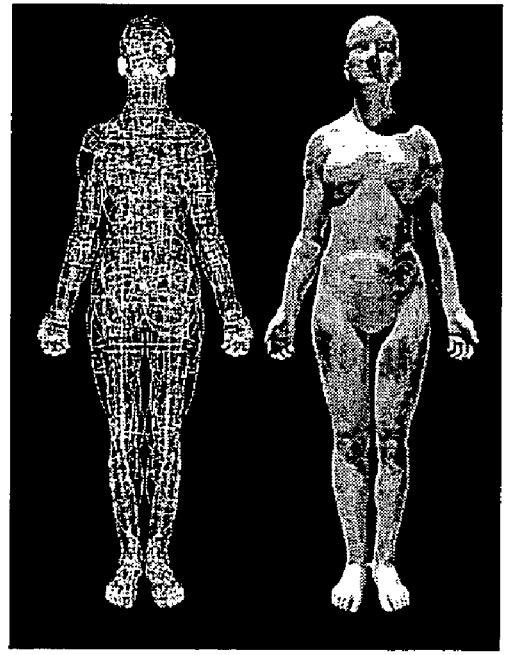
FIG. 7A is an explanatory view for explaining a generation of a 3-dimensional human body image which is obtained by using various metaballs in the prior art metaball drawing method.
Figure 7B:
FIG. 7B is an explanatory view for explaining a generation of a colorful complex 3-dimensional image which is obtained by using colorful metaballs in the prior art metaball drawing method.
Figure 8A:
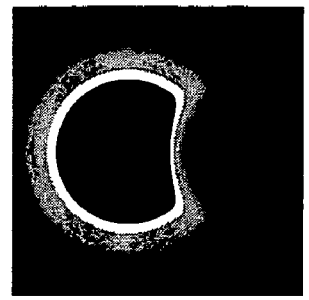
FIGS. 8A, 8B, 8C and 8D are explanatory views for explaining a generation of 2-dimensional distorted images which are obtained by using a metaball having a density distribution, a part of which features negative densities.
Figure 8B:
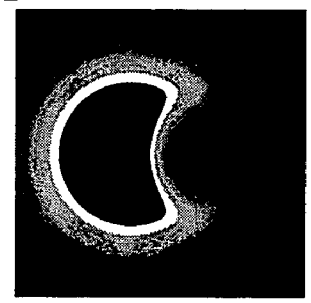
Figure 8C:
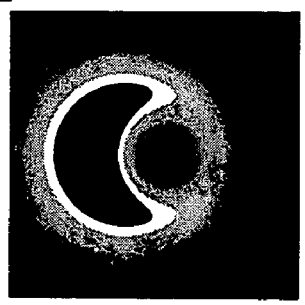
Figure 8D:
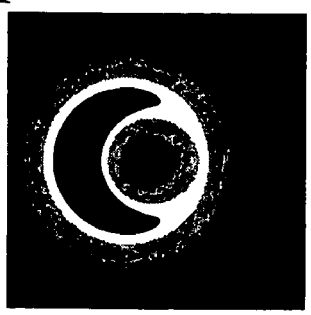

In the prior art metaball drawing method, various metaballs having individual density distributions may be defined on the screen of the monitor, and a threshold may be suitably set with respect to all the metaballs. In this case, it is possible to obtain a 3-dimensional human body image drawn with smoothly curved surfaces, as shown in FIG. 7A by way of example. Also, it is possible to obtain a colorful complex image, using metaballs having various chromatic colors, as shown in FIG. 7B by way of example. Note, in FIG. 7B, although the image is shown as a monochromatic image, in reality, it is shown as a colorful image.

Further, in the prior art metaball drawing method, it is possible to use a metaball having a density distribution, a part of which features negative densities. In this case, it is possible to obtain 2-dimensional distorted images, as shown in FIGS. 8A, 8B, 8C and 8D by way of example.

Figure 9A:
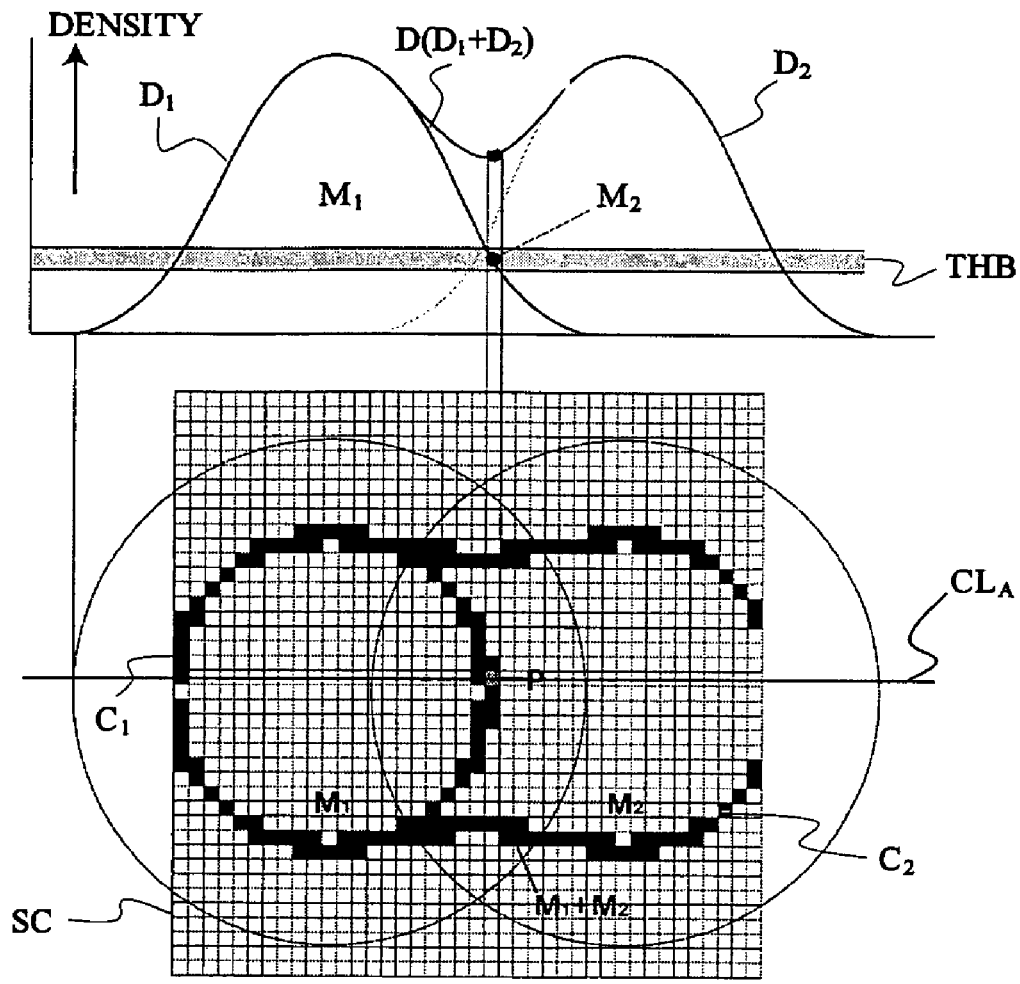
FIGS. 9A, 9B and 9C are explanatory views for explaining a concept of a metaball drawing method according to the present invention.
Figure 9B:
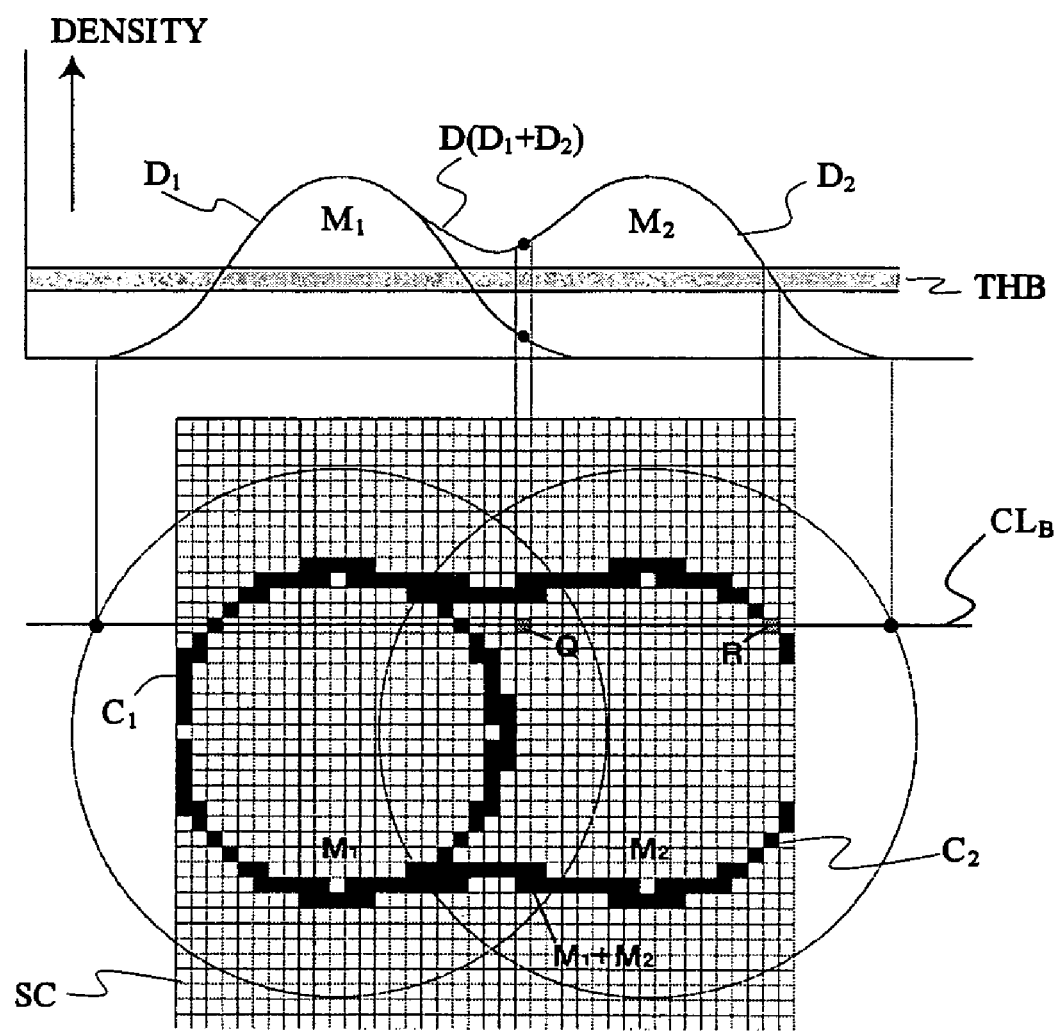
Figure 9C:
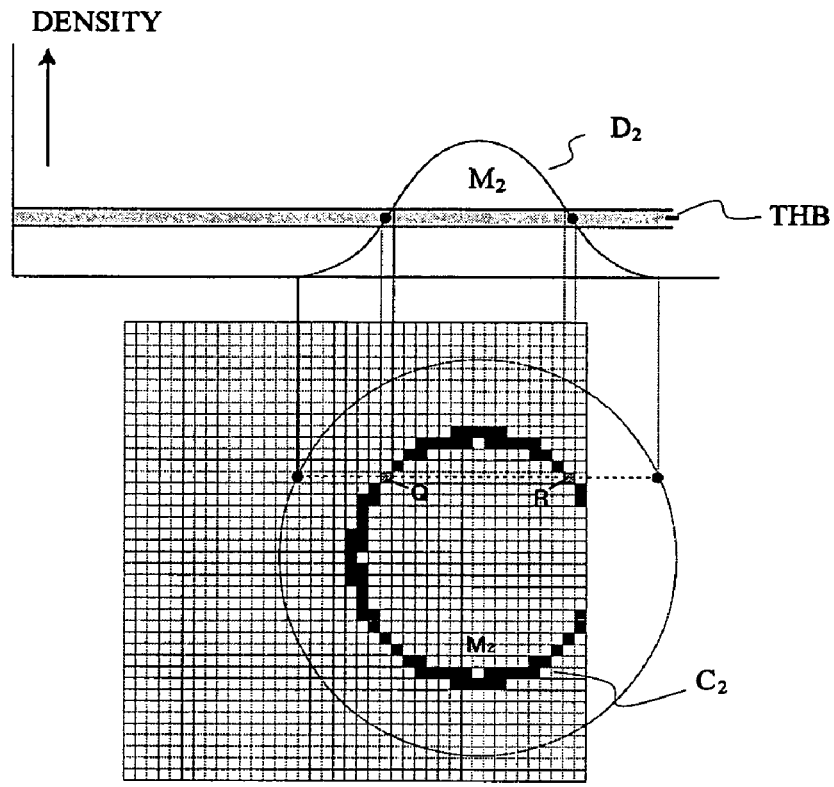

With reference to FIGS. 9A, 9B and 9C, in which the features similar to those of FIGS. 2A, 2B and 2C are indicated by the same references, a concept of a metaball drawing method according to the present invention is explained below.

In FIG. 9A, metaballs $M_1$ and $M_2$ are represented by respective density distributions $D_1$ and $D_2$ which are identical to each other, and are defined on the screen SC so as to partially overlap with each other, and thus the density distributions $D_1$ and $D_2$ are combined with each other to thereby produce a density distribution D. Also, a threshold band THB is set with respect to the combined density distribution D.

In the metaball drawing method according to the present invention, a setting of a background luminance value is previously given to all the pixels on the screen SC. In this example, the back ground luminance value is a white level.

First, it is determined whether a pixel on the screen SC is included in the metaball $M_1$. When the pixel is included in the metaball $M_1$, a density of the pixel is calculated based on the density distribution $D_1$. Then, it is determined whether the calculated density falls within the threshold band THB. When the calculated density falls within the threshold band THB, a given luminance value is set in the pixel concerned.

When all the pixels on the screen SC are processed as mentioned above, a circle $C_1$, which is derived from only the metaball $M_1$, is drawn and displayed as a 2-dimensional binary image on the screen SC, as shown in FIG. 9A.

Note, in FIG. 9A, one of the pixels for displaying the circle $C_1$ is representatively indicated by reference P, and a profile of the combined density distribution D is obtained by slicing the distribution D along a chain line $CL_A$ passing through the pixel P on the screen SC.

When a pixel on the screen SC is included in both the metaballs $M_1$ and $M_2$, a density of the pixel concerned is calculated based on the combined density distribution D. When the calculated density falls within the threshold band THB, the given luminance value is set in the pixel concerned. On the other hand, when the calculated density does not fall within the threshold band THB, the given luminance value cannot be set in the pixel concerned.

For example, when the density at the pixel P is calculated based on the combined density distribution D, it does not fall within the threshold band THB, i.e. it is above the threshold band THB, as shown in FIG. 9A. Accordingly, although the given luminance value cannot be set in the pixel P, the pixel P is already developed on the screen SC, because the density at the pixel P, which is calculated based on only the density distribution $D_1$, falls within the threshold band THB, as stated above.

In the above-mentioned prior art metaball drawing method of FIGS. 2A, 2B and 2C, the pixel P cannot developed on the screen SC, i.e. the pixel P has the white level as the background luminance value, but the pixel P is developed on the screen SC in the metaball drawing method according to the present invention. In this connection, the metaball drawing method according to the present invention is different from the prior art metaball drawing method.

In FIG. 9A, reference $C_2$ represents a semi-circle which is drawn and displayed on the screen SC based on the metaball $M_2$. In short, as shown in FIG. 9A, the circle $C_1$ partially fuses with the semi-circle 2, so that an outline of a gourd-like shape including the complete circle $C_1$ is drawn and displayed on the screen SC.

In FIG. 9B which is the same as the FIG. 9A except that a profile of the combined density distribution D is obtained by slicing the distribution D along a chain line $CL_B$ passing through pixels Q and R on the screen SC, when it is determined that the pixel Q is included in the metaball $M_1$, a density at the pixel Q is calculated based on only the density distribution $D_1$. The calculated density at the pixel Q is below the threshold band THB, and thus a given luminance value is not given to the pixel Q so that the pixel Q is not developed on the screen SC.

Also, when it is determined that the pixel Q is included in the metaball $M_2$, a density at the pixel Q is calculated based on the combined density distribution D. The calculated density at the pixel Q is above the threshold band THB, as shown in FIG. 9B, and thus the given luminance value is not given to the pixel Q so that the pixel Q is not developed on the screen SC.

On the other hand, in FIG. 9B, when it is determined that the pixel R is included in the metaball $M_2$, although a density at the pixel R is calculated based on the combined density distribution D, the pixel R is subjected to no influence of the metaball $M_1$. Thus, the calculated density at the pixel R falls within the threshold band THB, as shown in FIG. 9B, and thus the given luminance value is given to the pixel R so that the pixel R is developed on the screen SC.

As shown in FIG. 9C, if only the metaball $M_2$ is defined on the screen SC, the pixels Q and R are developed on the screen SC.

Also, according to the present invention, it is recognized which of the metaballs $M_1$ and $M_2$ precedes in processing the pixels. For example, in FIGS. 9A and 9B, it can be found that, first of all, the pixels are processed with the metaball $M_1$, and then are processed with the metaball $M_2$, because the circle $C_1$ derived from the metaball $M_1$ is completely drawn. In FIGS. 9A and 9B, if the metaball $M_2$ precedes the metaball $M_1$ in processing the pixels, the circle $C_2$ derived from the metaball $M_2$ is completely drawn.

Figure 10:
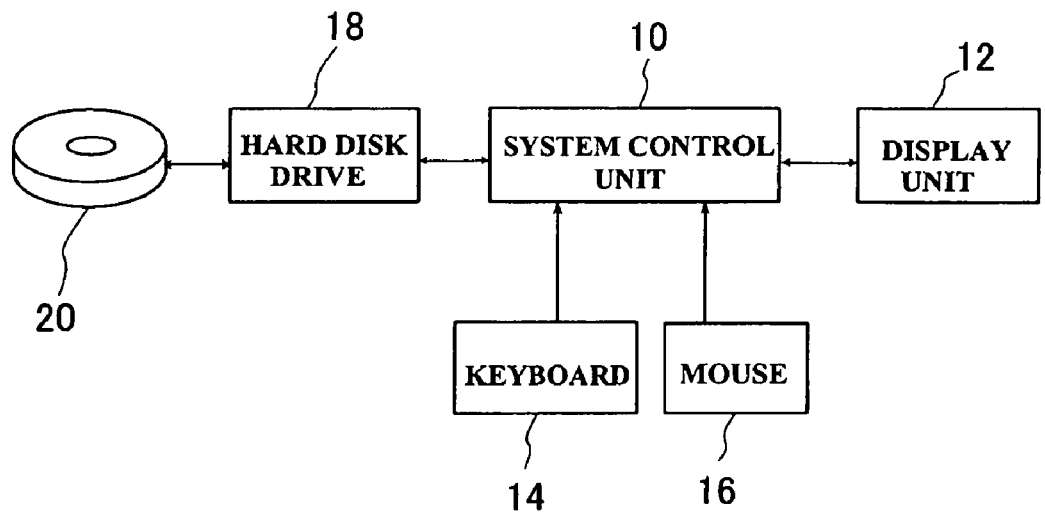
FIG. 10 is a block diagram of a metaball drawing system according to the present invention.

FIG. 10 shows a block diagram of a metaball drawing system according to the present invention.

The metaball drawing system comprises a system control unit 10 which contains a microcomputer comprising a central processing unit (CPU), a read-only memory (ROM) for storing various programs and constants, a random-access memory (RAM) for storing temporary data, and an input/output (I/O) interface circuit.

The metaball drawing system also comprises a display unit or monitor 12, such as a cathode ray tube (CRT), a liquid crystal display (LCD) or the like, for displaying an image, various command items and so on, and a keyboard 14 for inputting various commands and data to the system control unit 10 through the I/O interface circuit thereof. The metaball drawing system is provided with a mouse 16, which may be used to input a command to the system control unit 10 by clicking the mouse 16 on any one of the command items displayed on the display unit 12.

The metaball drawing system further comprises a hard disk drive 18 for driving a hard disk 20 in which a metaball drawing program, other programs, and various tables and so on are stored. The system control unit 10 writes the programs and the various data in the hard disk 20 through the hard disk drive 18, and also reads the various data from the hard disk 20 through the hard disk drive 18.

The system control unit 10 further contains a bitmap memory 22 as conceptually shown in FIG. 11, and an image to be displayed on the display unit 12 is created based on U×V pixels ($P_{uv}$) which are developed on the bitmap memory 22.

Figure 12:
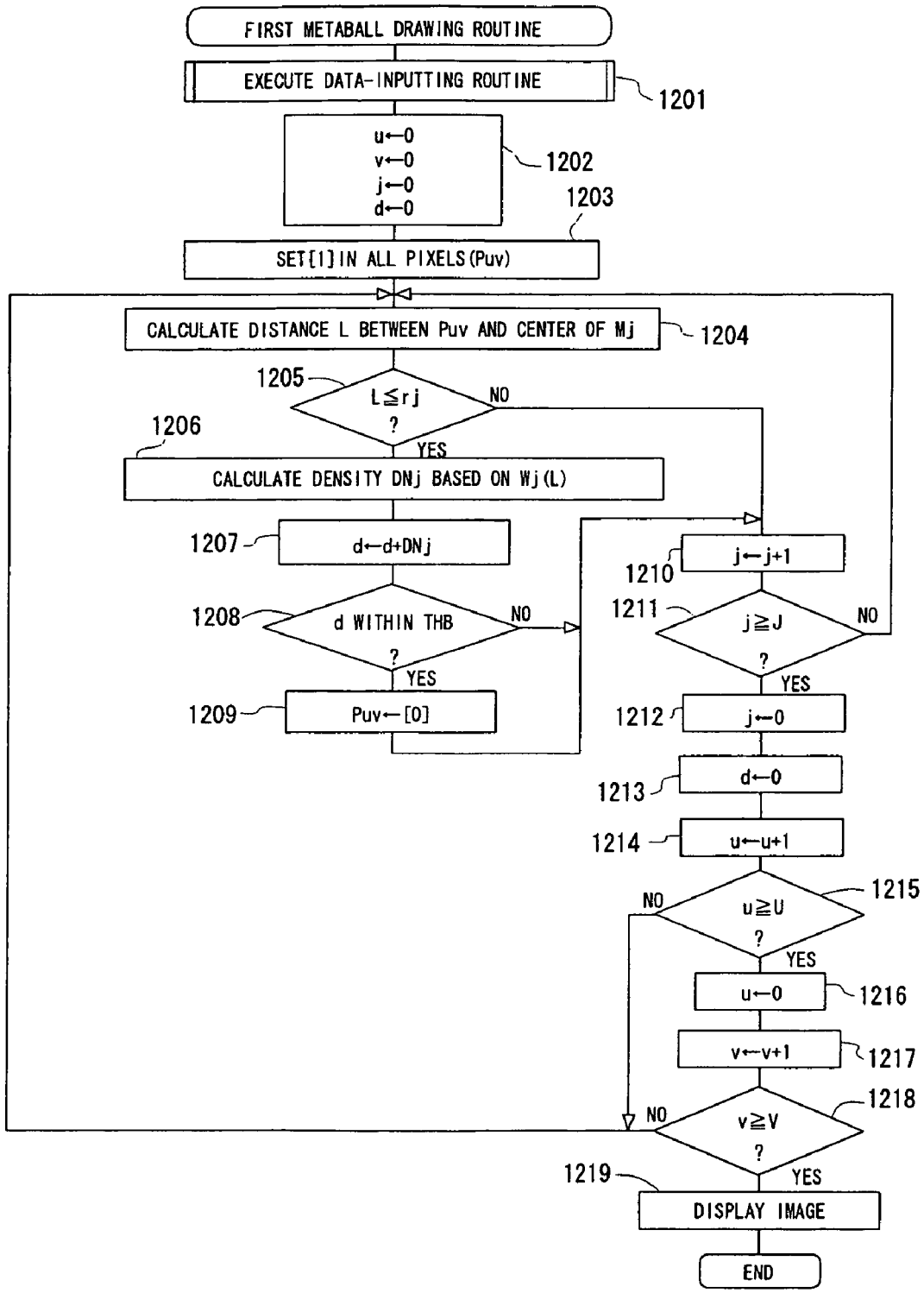
FIG. 12 is a flowchart of a first metaball drawing routine, which is executed in a system control unit shown in FIG. 10, showing a first embodiment of a metaball drawing method according to the present invention.

FIG. 12 shows a flowchart of a first metaball drawing routine, which is executed in the system control unit 10, showing a first embodiment of a metaball drawing method according to the present invention.

At step 1201, a data-inputting routine is executed as a sub-routine. During the execution of the data-inputting routine, X-Y coordinates of metaballs ($M_j$), density distribution functions ($W_j(L)$) representing the respective metaballs ($M_j$), a threshold band THB to be set with respect to the density distribution functions ($W_j(L)$) and so on are input to the system control unit 10 through a manipulation of the keyboard 14.

Otherwise, the data ($M_j$, $W_j(L)$, THB and so on) may be input to the system control unit 10 by clicking the mouse 16 on various data items displayed on the screen of the display unit 12.

After the inputting of the data ($M_j$, $W_j(L)$, THB and so on) to the system control unit 10 is completed, the control proceeds to step 1202, in which counters u, v and j are initialized to "0", and a variable d is initialized to "0".

Then, at step 1203, a background luminance value [1] is set in all the U×V pixels ($P_{uv}$). In this embodiment, the background luminance value [1] may be a black level.

At step 1204, a pixel $P_{uv}$ is read from the bitmap memory 22 (see: FIG. 11), and a distance L between the read pixel $P_{uv}$ and the center of the metaball $M_j$ is calculated in the manner as shown in FIG. 3. Then, at step 1205, it is determined whether the distance L is equal to or smaller than the radius $r_j$ of the metaball $M_j$, i.e. it is determined whether the pixel $P_{uv}$ is included in the metaball $M_j$.

When the pixel $P_{uv}$ is included in the metaball $M_j$, the control proceeds to step 1206, in which a density $DN_j$ at the pixel $P_{uv}$ is calculated based on the density distribution function $W_j(L)$. Then, at step 1207, the calculated density $DN_j$ is set as density data in the variable d by the following calculation:

$$d \leftarrow d + DN_j$$

At step 1208, it is determined whether the density data d falls within the threshold band THB. When the density data d falls within the threshold band THB, the control proceeds to step 1209, in which a luminance value [0] is set in the pixel $P_{uv}$. Then, the control proceeds to step 1210. Note, in this embodiment, the luminance value [0] may be a white level.

Also, at step 1205, when the pixel $P_{uv}$ is not included in the metaball $M_j$, or, at step 1208, when the density data d does not fall within the threshold band THB, the control proceeds to step 1210.

At step 1210, a count number of the counter j is incremented by "1". Then, at step 1211, it is monitored whether the count number of the counter j has reached "J", which is the total number of the metaballs ($M_j$) defined on the screen of the display unit 12. When the count number of the counter j has not reached "J", the control returns to step 1204. Namely, the routine comprising steps 1204 to 1211 is repeated until the count number of the counter j has reached "J". In other words, it is determined whether the pixel $P_{uv}$ is included in all the individual metaballs ($M_j$).

At step 1211, when the count number of the counter j has reached "J", the control proceeds to step 1212, in which the counter j is initialized to "0". Then, at step 1213, the variable d is initialized to "0".

At step 1214, a count number of the counter u is incremented by "1". Then, at step 1215, it is monitored whether the count number of the counter u has reached "U" (see: FIG. 11). When the count number of the counter u has not reached "U", the control returns to step 1204. Namely, the routine comprising steps 1204 to 1215 is repeated until the count number of the counter u has reached "U" (step 1215).

At step 1215, when the count number of the counter u has reached "U", the control proceeds to step 1216, in which the counter u is initialized to "0".

At step 1217, a count number of the counter v is incremented by "1". Then, at step 1218, it is monitored whether the count number of the counter v has reached "V" (see: FIG. 11). When the count number of the counter v has not reached "V", the control returns to step 1204. Namely, the routine comprising steps 1204 to 1218 is repeated until the count number of the counter v has reached "V" (step 1218).

At step 1218, when the count number of the counter v has reached "V", i.e. when the reading of all the pixels ($P_{uv}$) from the bitmap memory 22 (see: FIG. 11) has been completed, the control proceeds to step 1219, in which a 2-dimensional image is displayed as a binary image on the screen of the display unit 12 based on the processed pixels ($P_{uv}$). Namely, each of the processed pixels is developed on the screen of the display unit 12.

Note, in the above-mentioned first embodiment, although only one of the threshold band THB is used, it should be understood that more than one threshold band may be set with respect to the metaballs ($M_j$).

Figure 13:
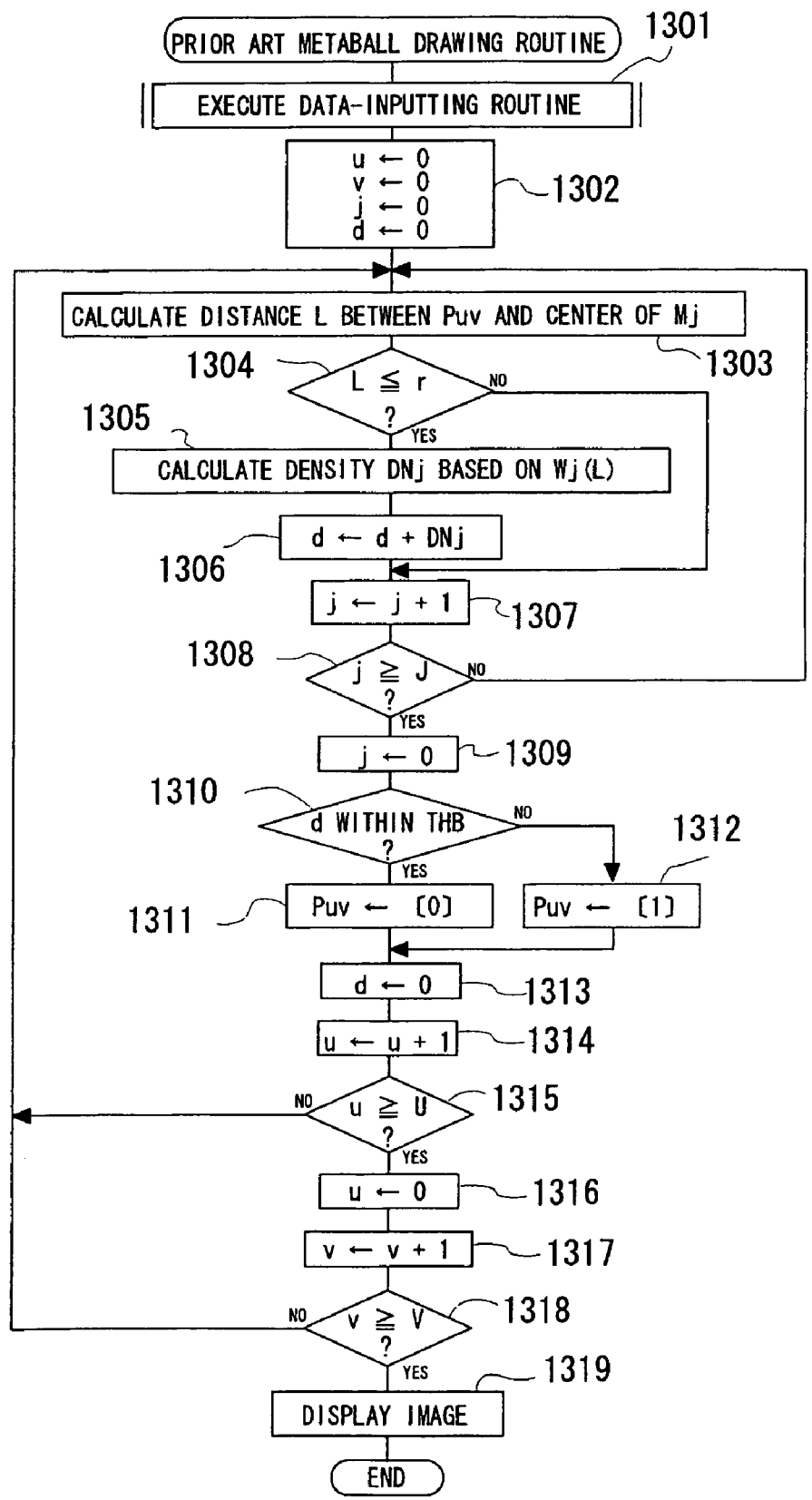
FIG. 13 is a flowchart of a prior art metaball drawing routine, which is executed in the system control unit shown in FIG. 10.

FIG. 13 shows a flowchart of a prior art metaball drawing routine which is executed in the system control unit 10.

At step 1301, a data-inputting routine is executed as a sub-routine. During the execution of the data-inputting routine, X-Y coordinates of metaballs ($M_j$), density distribution functions ($W_j(L)$) representing the respective metaballs ($M_j$), a threshold band THB to be set with respect to the density distribution functions ($W_j(L)$) and so on are input to the system control unit 10 through a manipulation of the keyboard 14.

After the inputting of the data ($M_j$, $W_j(L)$, THB and so on) to the system control unit 10 is completed, the control proceeds to step 1302, in which counters u, v and j are initialized to "0", and a variable d is initialized to "0".

At step 1303, a pixel $P_{uv}$ is read from the bitmap memory 22 (see: FIG. 11), and a distance L between the pixel $P_{uv}$ and the center of the metaball $M_j$ is calculated in the manner as shown in FIG. 3. Then, at step 1304, it is determined whether the distance L is equal to or smaller than the radius $r_j$ of the metaball $M_j$, i.e. it is determined whether the pixel $P_{uv}$ is included in the metaball $M_j$.

When the pixel $P_{uv}$ is included in the metaball $M_j$, the control proceeds to step 1305, in which a density $DN_j$ at the pixel $P_{uv}$ is calculated based on the density distribution function $W_j(L)$. Then, at step 1306, the calculated density $DN_j$ is set as density data in the variable d by the following calculation:

$$d \leftarrow d + DN_j$$

At step 1307, a count number of the counter j is incremented by "1". Then, at step 1308, it is monitored whether the count number of the counter j has reached "J", which is the total number of the metaballs ($M_j$) defined on the screen of the display unit 12. When the count number of the counter j has not reached "J", the control returns to step 1304.

On the other hand, at step 1304, when the pixel $P_{uv}$ is not included in the metaball $M_j$, the control skips from step 1303 to step 1307. Namely, the routine comprising steps 1303 to 1308 is repeated until the count number of the counter j has reached "J". In other words, it is determined whether the pixel $P_{uv}$ is included in all the individual metaballs ($M_j$).

At step 1308, when the count number of the counter j has reached "J", the control proceeds to step 1309, in which the counter j is initialized to "0".

At step 1310, it is determined whether the density data d falls within the threshold band THB. When the density data d falls within the threshold band THB, the control proceeds to step 1311, in which a luminance value or white level [0] is set in the pixel $P_{uv}$. On the other hand, when the density data d does not fall within the threshold band THB, the control proceeds to step 1312, in which a background luminance value or black level [1] is set in the pixel $P_{uv}$. In either event, at step 1313, the variable d is initialized to "0".

At step 1314, a count number of the counter u is incremented by "1". Then, at step 1315, it is monitored whether the count number of the counter u has reached "U" (see: FIG. 11). When the count number of the counter u has not reached "U", the control returns to step 1303. Namely, the routine comprising steps 1303 to 1315 is repeated until the count number of the counter u has reached "U" (step 1315).

At step 1315, when the count number of the counter u has reached "U", the control proceeds to step 1316, in which the counter u is initialized to "0".

At step 1317, a count number of the counter v is incremented by "1". Then, at step 1318, it is monitored whether the count number of the counter v has reached "V" (see: FIG. 11). When the count number of the counter v has not reached "V", the control returns to step 1303. Namely, the routine comprising steps 1303 to 1318 is repeated until the count number of the counter v has reached "V" (step 1318).

At step 1318, when the count number of the counter v has reached "V", i.e. when the reading of all the pixels ($P_{uv}$) from the bitmap memory 22 (see: FIG. 11) has been completed, the control proceeds to step 1319, in which a 2-dimensional image is displayed as a binary image on the screen of the display unit 12 based on the processed pixels ($P_{uv}$). Namely, each of the processed pixels is developed on the screen of the display unit 12.

In the metaball drawing routine (FIG. 12) according to the present invention, when a pixel $P_{uv}$ is included in a metaball $M_j$ (step 1205), a density $DN_j$ at the pixel $P_{uv}$ is calculated based on a density distribution function $W_j$ (L) (step 1206), and the calculated density $DN_j$ is set as density data in the variable d (step 1207). At this time, if the density data d ($DN_j$) falls within the threshold band THB, a setting of the luminance value [1] is given to the pixel $P_{uv}$ (step 1209). Thereafter, when it is determined that the pixel $P_{uv}$ is included in another metaball $M_{(j+c)}$ ($c \leq J$), a density $DN_{(j+c)}$ is calculated based on a density distribution function $W_{(j+c)}$ (L), and the calculated density $DN_{(j+c)}$ is accumulated in the density data d ($DN_j + DN_{(j+c)}$). At this time, although the density data d ($DN_j + DN_{(j+c)}$) does not fall within the threshold band THB, the setting of the luminance value [1] to the pixel $P_{uv}$ is maintained.

On the other hand, in the prior art metaball drawing routine (FIG. 13), whenever it is determined that a pixel $P_{uv}$ is included in a metaball $M_j$, a density $DN_j$ at the pixel $P_{uv}$ is calculated based on a density distribution function $W_j(L)$ (step 1305), and the calculated density $DN_j$ is accumulated as density data in the variable d (step 1306). After it is determined whether the pixel $P_{uv}$ is included in all the individual metaballs ($M_j$), it is determined whether the accumulated density data d falls within the threshold band THB (step 1310).

In this connection, the metaball drawing method according to the present invention is different from the prior art metaball drawing method.

Due to the difference between the prior art metaball drawing method and the metaball drawing method according to the present invention, when the metaball drawing routines of FIGS. 12 and 13 are executed on the condition that the X-Y coordinates of the metaballs ($M_j$), the density distribution function ($W_j$ (L)) and the threshold band THB are set in the same manner, a 2-dimensional image, which is obtained by the execution of the metaball drawing routine (FIG. 12) according to the present invention, is considerably different from a 2-dimensional image which is obtained by the execution of the prior art metaball drawing routine (FIG. 13), as shown in FIGS. 14A and 14B, FIGS. 15A and 15B, and FIGS. 16A, 16B, 16C and 16D by way of example.

Figure 14A:
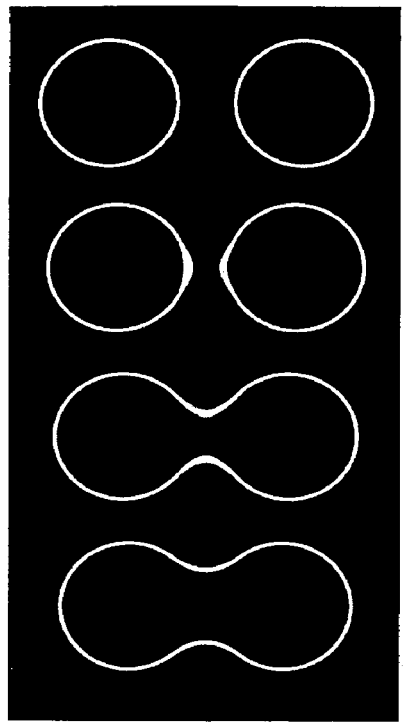
FIG. 14A is an explanatory view showing by way of example of a 2-dimensional image obtained by the prior art metaball drawing routine of FIG. 13.

FIG. 14A shows a state in which a pair of circles gradually approach each other so as to be partially fuse with each other, and the pair of circles are generated based on two metaballs, using the prior art metaball drawing routine (FIG. 13). When the metaballs overlap with each other, the circles are partially fuse with each other, to thereby produce an outline of a gourd-like shape, which is drawn by a smoothly curved line.

Figure 14B:
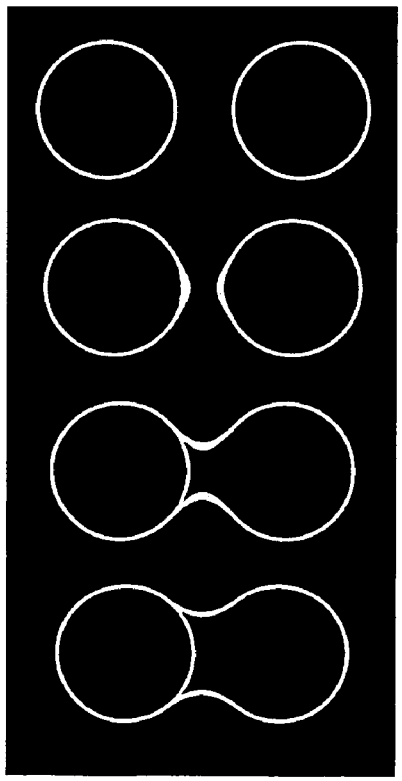
FIG. 14B is an explanatory view showing by way of example another 2-dimensional image obtained by the metaball drawing routine of FIG. 12.

FIG. 14B also shows a state in which a pair of circles gradually approach each other so as to be partially fuse with each other, and the pair of circles are generated based on two metaballs, using the metaball drawing routine (FIG. 12) according to the present invention. Similar to the case of FIG. 14A, when the metaballs overlap with each other, the circles are partially fuse with each other, to thereby produce an outline of a gourd-like shape, which is drawn by a smoothly curved line, but one of the circles is completely drawn. In FIG. 14B, it is possible to easily recognize which metaball precede in processing the pixels.

Figure 15A:
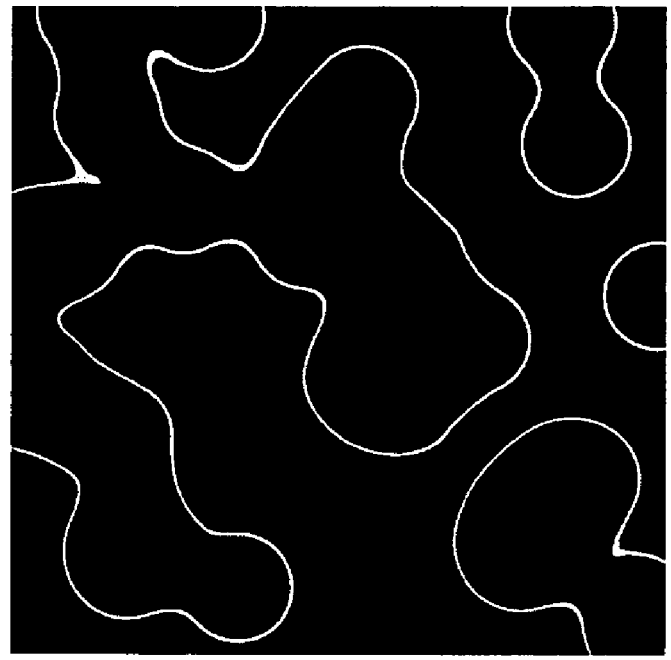
FIG. 15A is an explanatory view showing by way of example of another 2-dimensional image obtained by the prior art metaball drawing routine of FIG. 13.
Figure 15B:
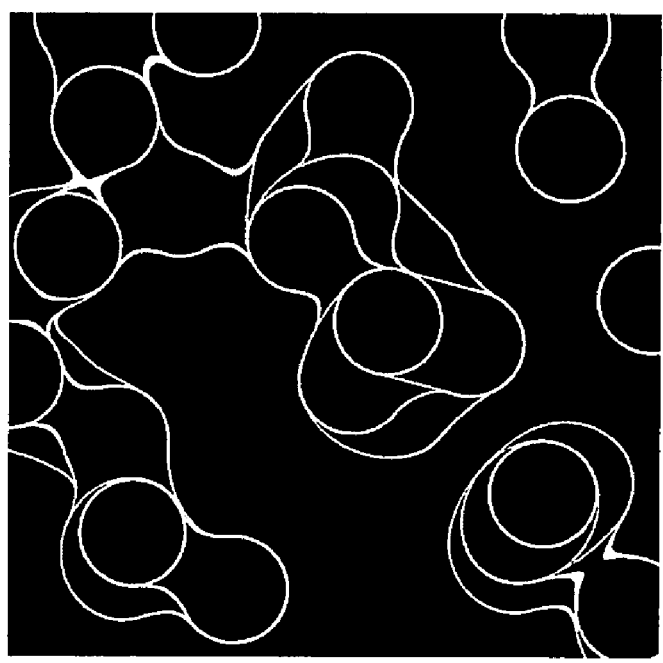
FIG. 15B is an explanatory view showing by way of example another 2-dimensional image obtained by the metaball drawing routine of FIG. 12.

FIGS. 15A and 15B show respective two 2-dimensional binary images which are obtained by the prior art metaball drawing routine (FIG. 13) and the metaball drawing routine (FIG. 12) according to the present invention. The images are based on a plurality of metaballs which are defined and arranged on the screen of the monitor 12. The image of FIG. 15A is very simple, whereas the image of FIG. 15B features a complexity. Also, in FIG. 15B, it is possible to easily recognize the arrangement of the metaballs.

Figure 16A:
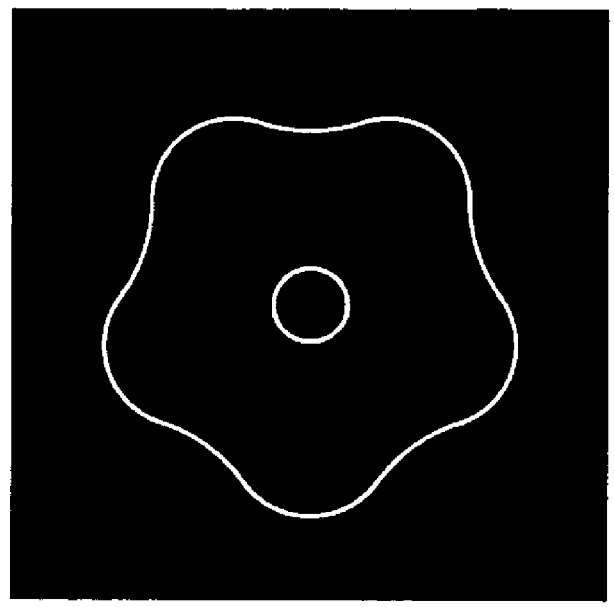
FIG. 16A is an explanatory view showing by way of example of yet another 2-dimensional image obtained by the prior art metaball drawing routine of FIG. 13.
Figure 16B:
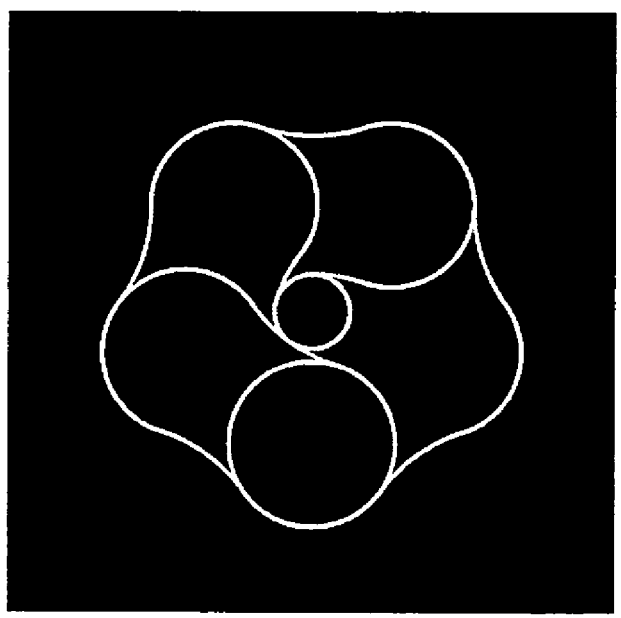
FIG. 16B is an explanatory view showing by way of example yet another 2-dimensional image obtained by the metaball drawing routine according to the present invention.

FIGS. 16A and 16B show respective two 2-dimensional binary images which are obtained by the prior art metaball drawing routine (FIG. 13) and the metaball drawing routine (FIG. 12) according to the present invention. The images are based on the five metaballs which are defined and arranged at the five corners of a pentagon on the screen of the monitor 12. The image of FIG. 16A is drawn by two simple curved lines, whereas the image of FIG. 16B is drawn by a plurality of curved lines. Also, in FIG. 16B, it is possible to recognize a procedure in which the pixels are processed with the individual metaballs.

Figure 16C:
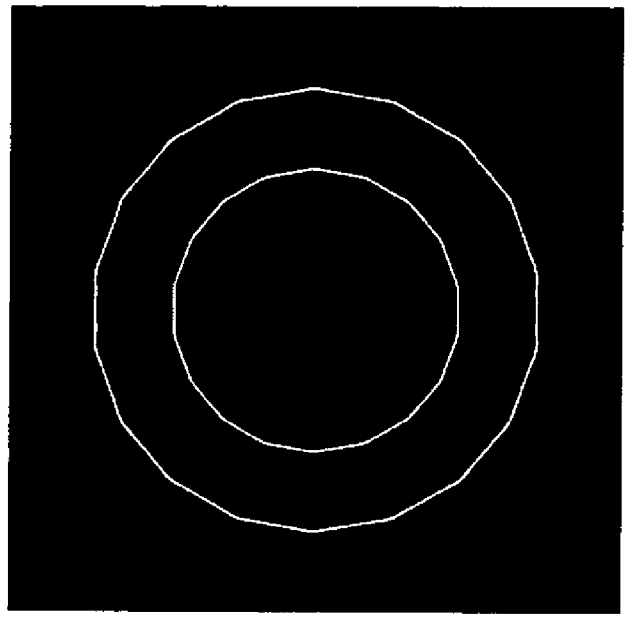
FIG. 16C is an explanatory view showing by way of example of still yet another 2-dimensional image obtained by the prior art metaball drawing routine of FIG. 13.
Figure 16D:
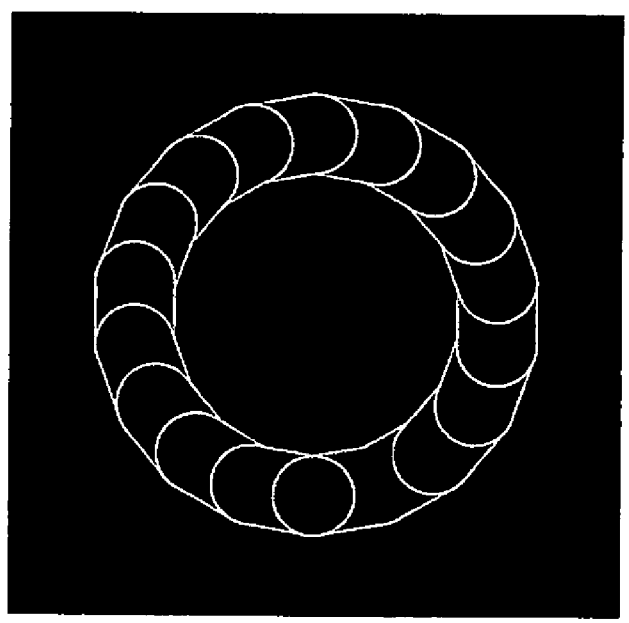
FIG. 16D is an explanatory view showing by way of example still yet another 2-dimensional image obtained by the metaball drawing routine of FIG. 12.

FIGS. 16C and 16D show respective two 2-dimensional binary images which are obtained by the prior art metaball drawing routine (FIG. 13) and the metaball drawing routine (FIG. 12) according to the present invention. The images are based on a plurality of metaballs which are defined and arranged along a circle at regular intervals on the screen of the monitor 12. The image of FIG. 16C is drawn by two-circular lines, whereas the image of FIG. 16D is drawn by a plurality of semi-circular lines. Also, similar to the case of FIG. 16B, in FIG. 16D, it is possible to easily recognize a procedure in which the pixels are processed with the individual metaballs.

Figure 17A:
FIG. 17A is an explanatory view showing by way of example of still yet another 2-dimensional image obtained by the metaball drawing routine of FIG. 12.
Figure 17B:
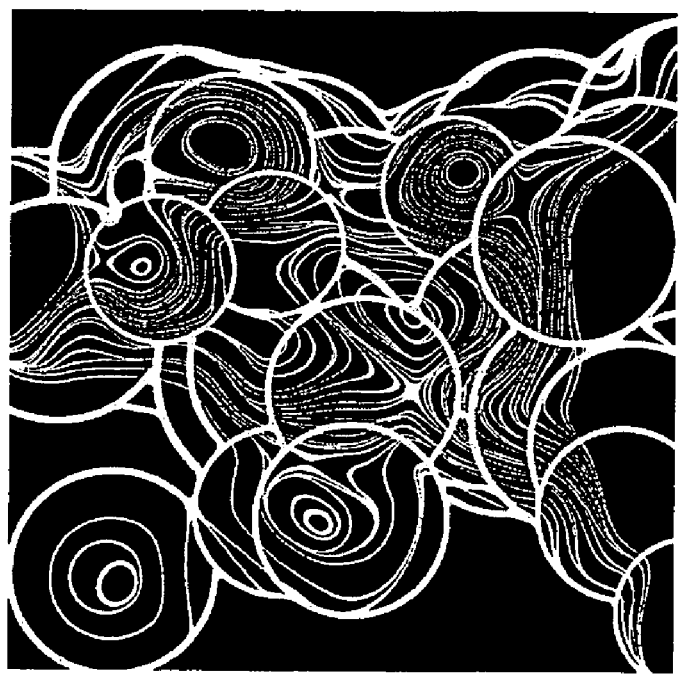
FIG. 17B is an explanatory view showing by way of example still yet another 2-dimensional image obtained by the metaball drawing routine of FIG. 12.

FIGS. 17A and 17B show respective two 2-dimensional binary images which are obtained by the metaball drawing routine (FIG. 12) according to the present invention. The images are based on a plurality of metaballs which are defined and arranged on the screen of the monitor 12, and a part of the metaballs features a negative density distribution. By using the metaballs featuring the negative density distribution, it is possible to draw the images by a plurality of complex curved lines, as shown in FIGS. 17A and 17B. Note, it is impossible to express the complexity of the 2-dimensional images of FIGS. 17A and 17B, by the prior art metaball drawing routine (FIG. 13).

Figure 18A:
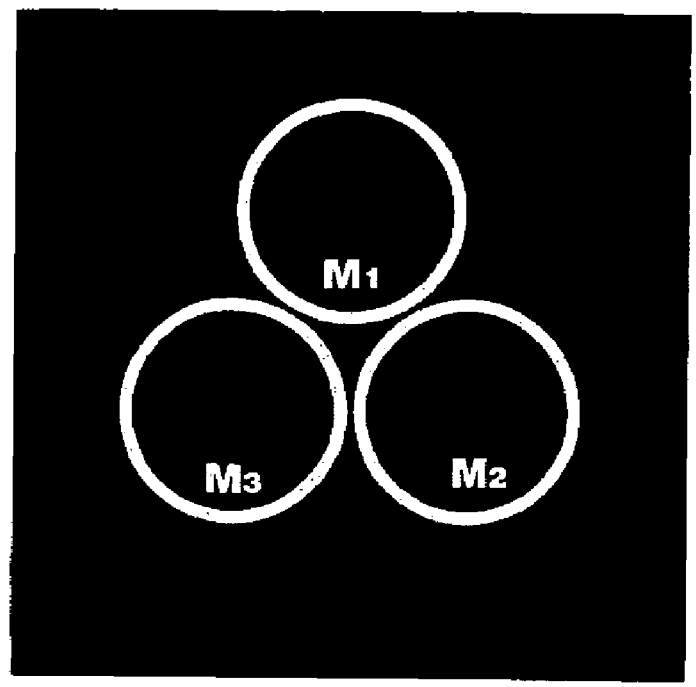
FIG. 18A is an explanatory view showing an arrangement of three metaballs, which are to be processed by the metaball drawing routine of FIG. 12.

FIG. 18A shows an arrangement of metaballs $M_1$, $M_2$ and $M_3$, which are defined and arranged at the three corners of a triangle on the screen of the monitor 12, and which are to be processed by the metaball drawing routine (FIG. 12) according to the present invention.

Figure 18B:
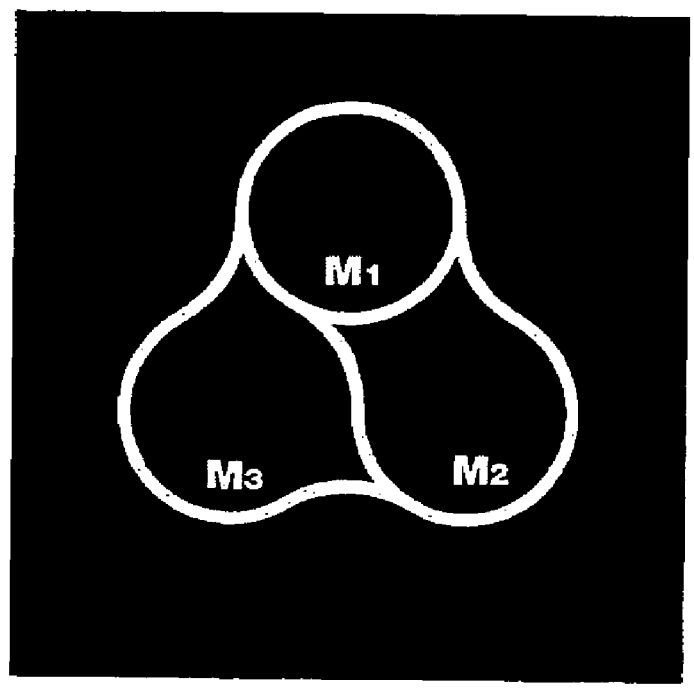
FIG. 18B is an explanatory view showing a 2-dimensional image obtained from the arrangement of the metaballs of FIG. 18A by the metaball drawing routine of FIG. 12.

In FIG. 18A, when the pixels are processed by the metaballs $M_1$, $M_2$ and $M_3$ in order, a 2-dimensional image is obtained, as shown in FIG. 18B. In this case, it is possible to easily recognize the procedure in which the pixels with the individual metaballs $M_1$, $M_2$ and $M_3$ were processed, because the image derived from the metaball $M_1$ is drawn as a circle, because the image derived from the metaball $M_2$ is drawn as extended from the image (circle) derived from the metaball $M_1$, and because the image derived from the metaball $M_3$ is drawn as extended from the images derived from the metaballs $M_1$ and $M_2$. In short, according to the present invention, when a number of metaballs is small, the procedure of the processing of the pixels with the individual metaballs can be easily recognized, as is apparent from FIG. 18B.

Figure 19A:
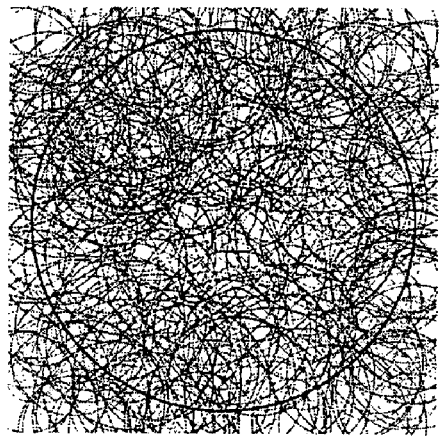
FIG. 19A is an explanatory view showing an arrangement of metaballs each having a positive density distribution and a large metaball having a negative density distribution.

FIG. 19A shows a state in which 500 small metaballs, each having a positive density distribution, are defined and arranged at random on the screen of the monitor 12, and in which a large metaball, having a negative density distribution, is defined and arranged at a center of the screen, with only a threshold band being set with respect to the positive density distributions.

Figure 19B:
FIG. 19B is an explanatory view showing a 2-dimensional image obtained from the arrangement of the metaballs of FIG. 19A by the prior art metaball drawing routine of FIG. 13.

In FIG. 19A, when the pixels are processed with the 500 small metaballs and the large metaball, using the prior art metaball drawing routine (FIG. 13), a 2-dimensional image is obtained as shown in FIG. 19B. As shown in this drawing, it is possible to hardly recognize the existence of the 500 small metaballs.

Figure 19C:
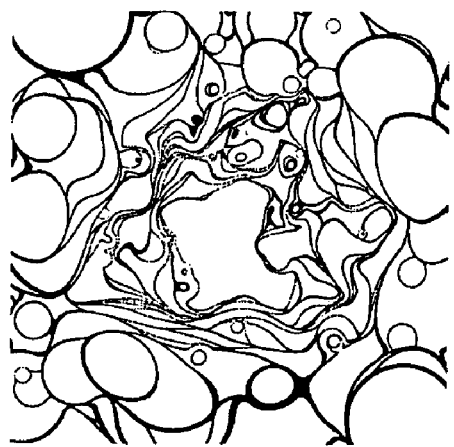
FIG. 19C is an explanatory view showing a 2-dimensional image obtained from the arrangement of the metaballs of FIG. 19A by the metaball drawing routine of FIG. 12.

On the other hand, in FIG. 19A, when the pixels are processed with the 500 metaballs and the large metaball, using the metaball drawing routine (FIG. 12) according to the present invention, a 2-dimensional image is obtained as shown in FIG. 19C. As shown in this drawing, not only can the existence of the small metaballs be recognized, but also it is found that the image is distorted in the central area due to the existence of the large metaball. In short, the image of FIG. 19C is complex and attractive in comparison with the image of FIG. 19B.

Figure 20A:
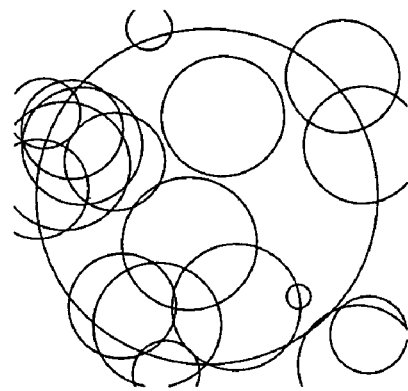
FIG. 20A is an explanatory view showing an arrangement of metaballs each having a negative density distribution and a large metaball having a positive density distribution.

FIG. 20A shows a state in which several tens of small metaballs, each having a negative density distribution, are defined and arranged at random on the screen of the monitor 12, and in which a large metaball, having a positive density distribution, is defined and arranged at a center of the screen, with only a threshold band being set with respect to the positive density distribution.

Figure 20B:
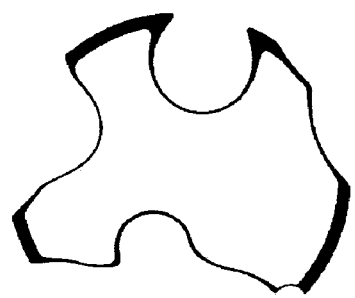
FIG. 20B is an explanatory view showing a 2-dimensional image obtained from the arrangement of the metaballs of FIG. 20A by the prior art metaball drawing routine of FIG. 13.

In FIG. 20A, when the pixels are processed with the small metaballs and the large metaball, using the prior art metaball drawing routine (FIG. 13), a 2-dimensional image is obtained as shown in FIG. 20B. As shown in this drawing, the image has an incomplete circle derived from the large metaball having the positive density distribution. Namely, the circle derived from the large metaball is eaten by the small metaballs having the negative density distributions.

Figure 20C:
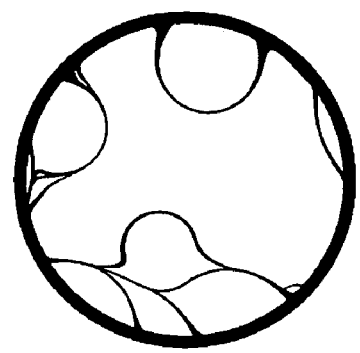
FIG. 20C is an explanatory view showing a 2-dimensional image obtained from the arrangement of the metaballs of FIG. 20A by the metaball drawing routine of FIG. 12.

On the other hand, in FIG. 20A, when the pixels are processed with the small metaballs and the large metaball, using the metaball drawing routine (FIG. 12) according to the present invention, a 2-dimensional image is obtained as shown in FIG. 20C. As shown in this drawing, the image has a complete circle derived from the large metaball having the positive density distribution, and a plurality of curved lines derived from the small metaballs, having the negative density distribution, are included in the large metaball. In short, the image of FIG. 20C is attractive in comparison with the image of FIG. 20B.

As already stated hereinbefore, in this field, the various density distribution functions are proposed.

In the prior art metaball drawing routine of FIG. 13, it is possible to optionally select one of the various density distribution functions, as shown in FIGS. 21A and 21B, FIGS. 22A and 22B, FIGS. 23A and 23B, FIGS. 24A and 24B, by way of example.

Figure 21A:
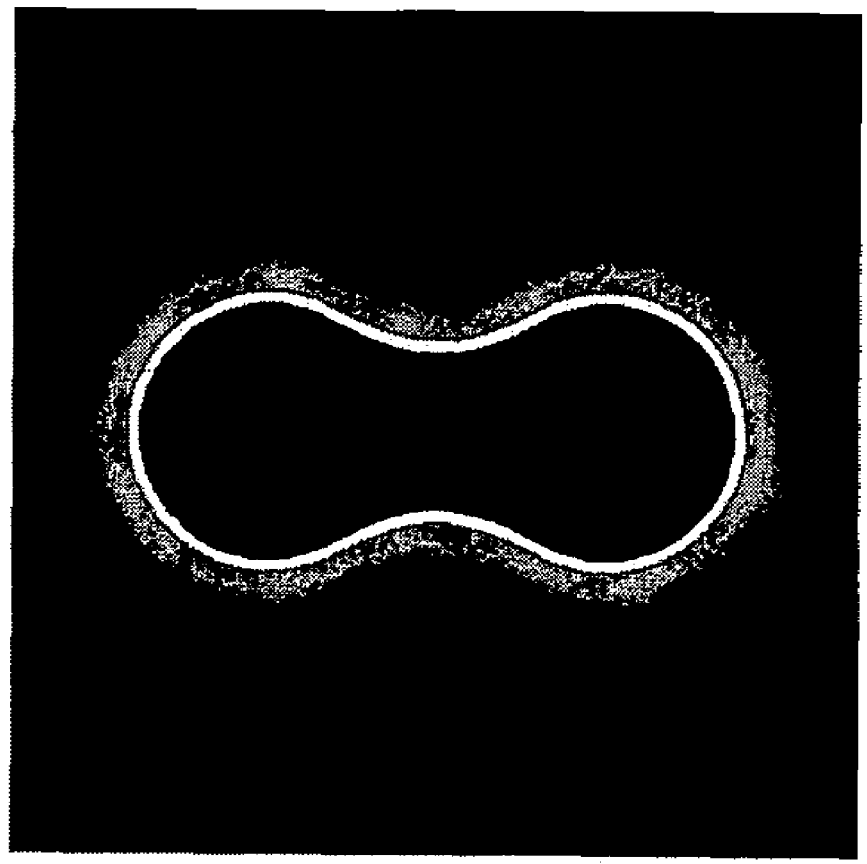
FIG. 21A is an explanatory view showing an image generated based on the two metaballs as shown in FIG. 2C.

An image of FIG. 21A is obtained by the execution of the prior art metaball drawing routine (FIG. 13) when two metaballs ($M_1$ and $M_2$) are defined and arranged on the screen of the display unit 12, as shown in FIG. 2C. In this case, as explained with reference to FIG. 2C, each of the metaballs ($M_1$ and $M_2$) has a density distribution, as shown in FIG. 21B, which is equivalent to the density distribution ($D_1$, $D_2$) of FIG. 2C.

Figure 21B:
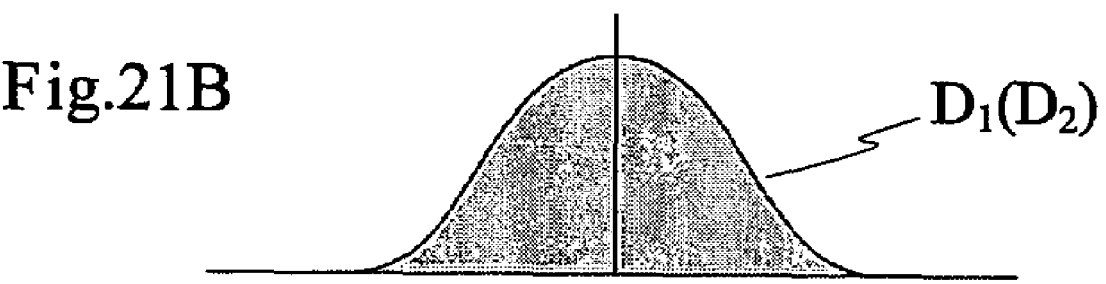
FIG. 21B is an explanatory view showing a density distribution function from which the image of FIG. 21A is obtained.
Figure 22A:
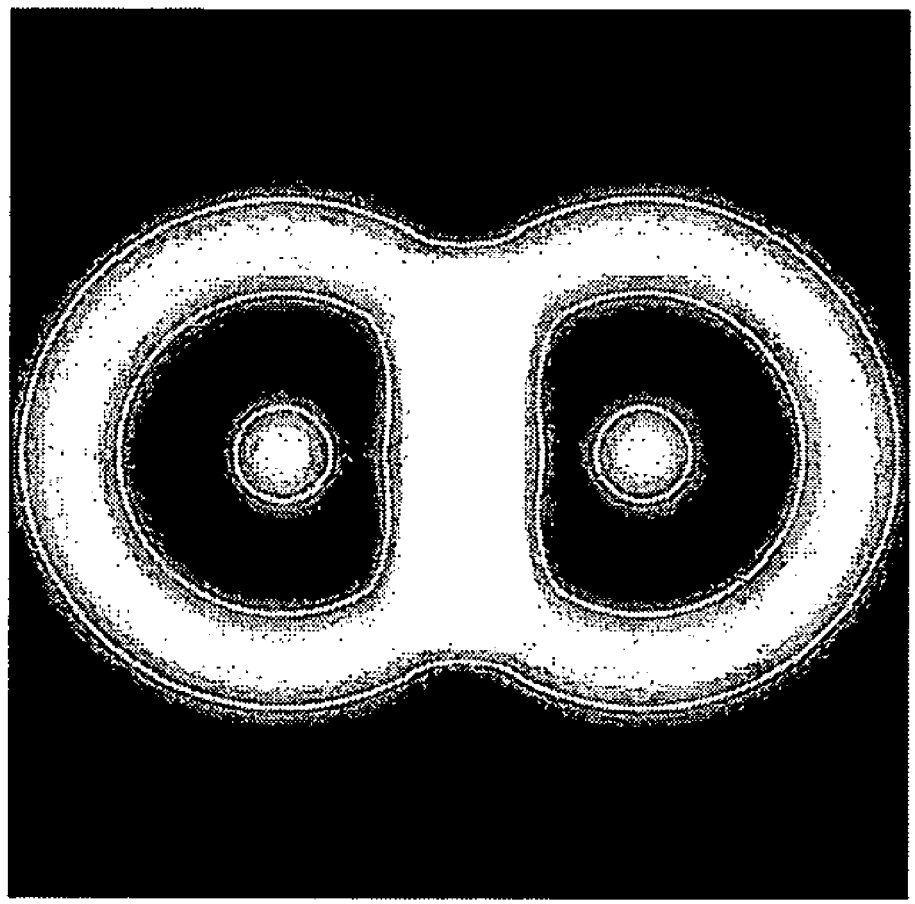
FIG. 22A is an explanatory view showing another image generated based on the two metaballs as shown in FIG. 2C.
Figure 22B:
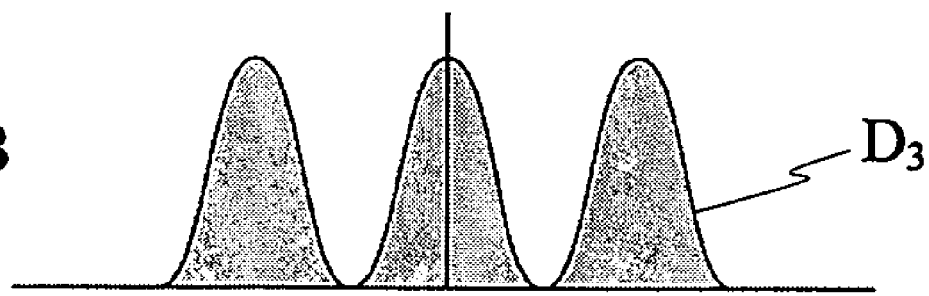
FIG. 22B is an explanatory view showing another density distribution function from which the image of FIG. 22A.

An image of FIG. 22A is derived from the aforesaid metaballs ($M_1$ and $M_2$) when a density distribution $D_3$ of FIG. 22B is substituted for the density distribution ($D_1$, $D_2$) of FIG. 21B.

Figure 23A:
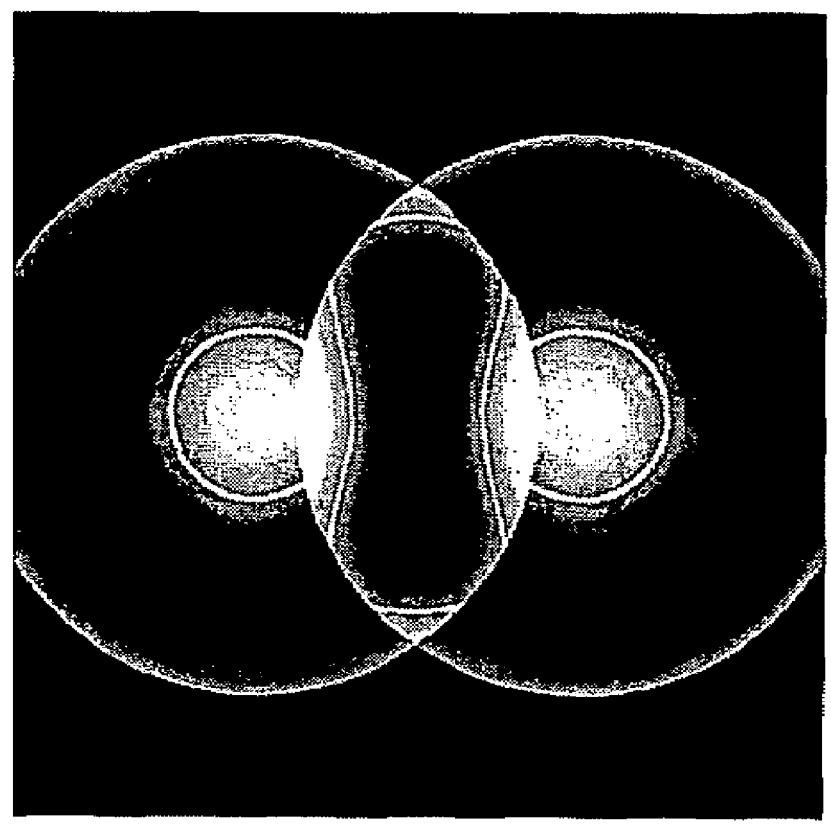
FIG. 23A is an explanatory view showing yet another image generated based on the metaballs as shown in FIG. 2C.
Figure 23B:
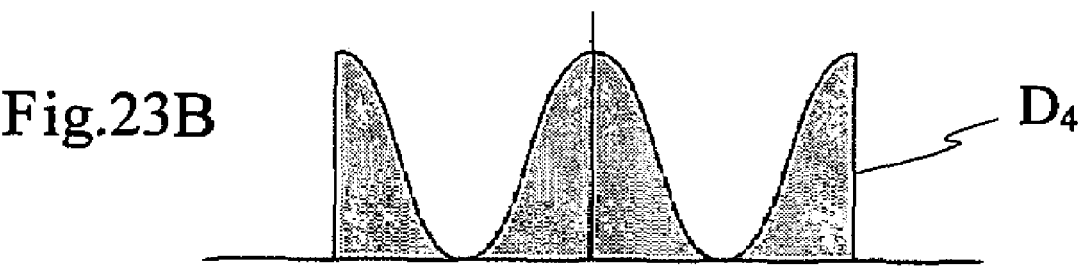
FIG. 23B is an explanatory view showing yet another density distribution function from which the image of FIG. 23A.

Also, an image of FIG. 23A is derived from the aforesaid metaballs ($M_1$ and $M_2$) when a density distribution $D_4$ of FIG. 23B is substituted for the density distribution ($D_1$, $D_2$) of FIG. 21B.

Figure 24A:
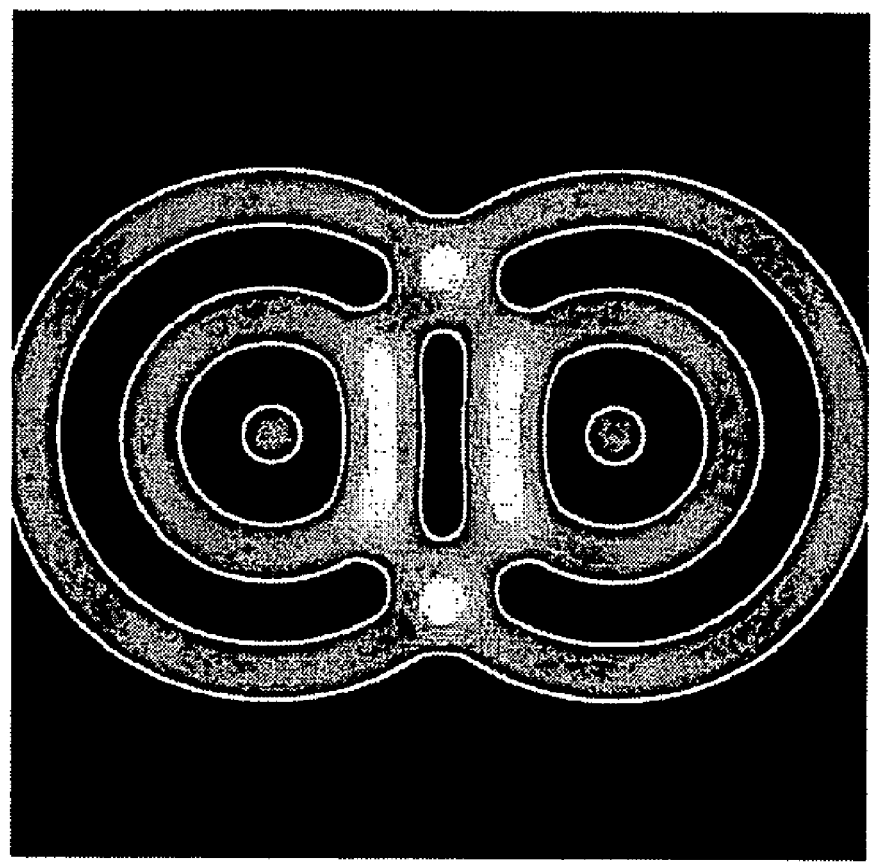
FIG. 24A is an explanatory view showing still yet another image generated based on the metaballs as shown in FIG. 2C.
Figure 24B:
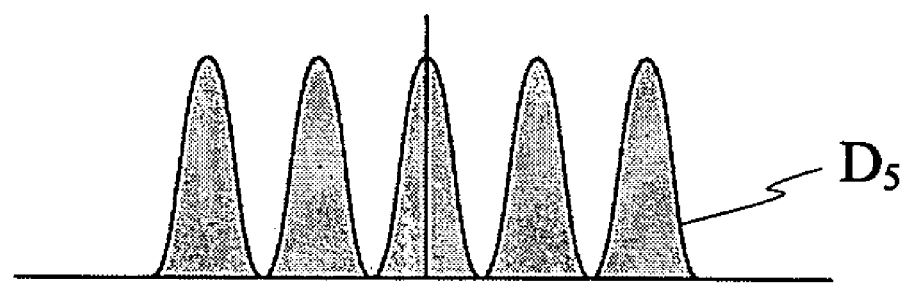
FIG. 24B is an explanatory view showing still yet another density distribution function from which the image of FIG. 24A.

Further, an image of FIG. 24A is derived from the aforesaid metaballs ($M_1$ and $M_2$) when a density distribution $D_5$ of FIG. 24B is substituted for the density distribution ($D_1$, $D_2$) of FIG. 21B.

In short, it is possible to generate various images by selecting and using one of the various density distribution functions, as shown in FIGS. 22A and 22B, FIGS. 23A and 23B and FIGS. 24A and 24B by way example.

Note, although each of the images shown in FIGS. 22A, 23A and 24A is shown as not a binary image but a gradation image, it is possible to generate the gradation image in a prior art metaball.

Of course, in the metaball drawing method according to the present invention, it is possible to suitably use the various density distribution functions shown in FIGS. 22B, 23B and 24B.

As apparent from the foregoing, in the prior art metaball drawing routine (FIG. 13), when metaballs overlap with each other, a 2-dimensional image, which is obtained from the overlapped metaballs, is drawn by a smoothly curved outline or iso-density line, as explained with reference to FIGS. 2B and 2C. In this case, settings of the background luminance value are given to all the pixel included in an area surrounded by the smoothly curved outline. Namely, there is no drawing line in the area surrounded by the smoothly curved outline.

Figure 25A:
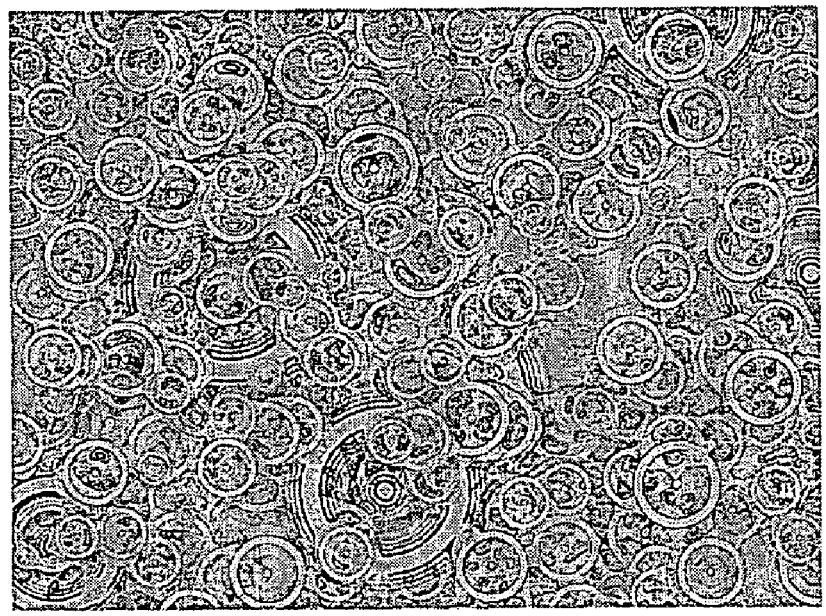
FIGS. 25A and 25B are explanatory views showing by way of example 2-dimensional images obtained by the metaball drawing routine of FIG. 12.
Figure 25B:
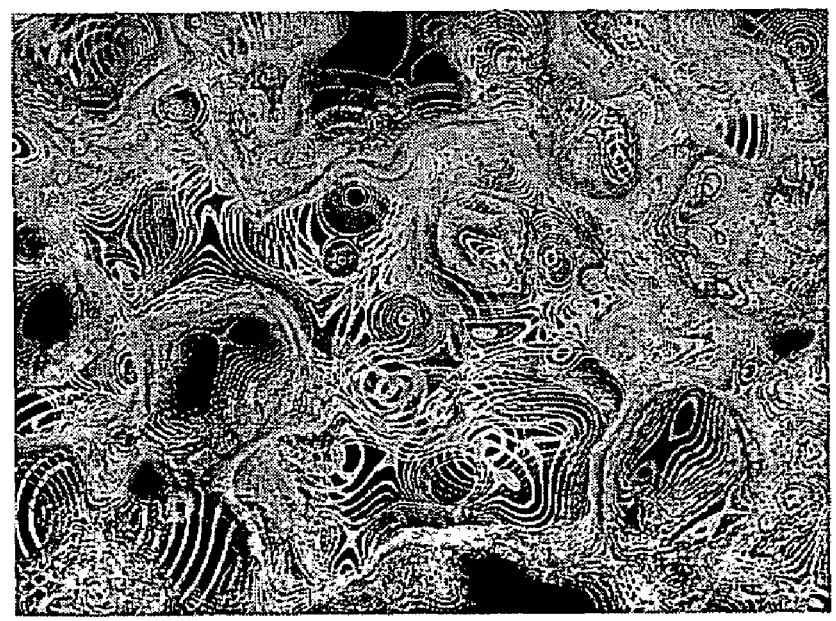

On the other hand, in the metaball drawing routine (FIG. 12) according to the present invention, various drawing lines can be drawn in the area surrounded by the smoothly curved outline. As a result, according to the present invention, it is possible to obtain various complex and attractive images, as shown in FIGS. 25A and 25B by way of example. Note, in the image shown in FIG. 25A, a plurality of metaballs are defined on the screen of the display unit 12, and each of the metaballs is represented by the density distribution function shown in FIG. 22B.

Figure 26:
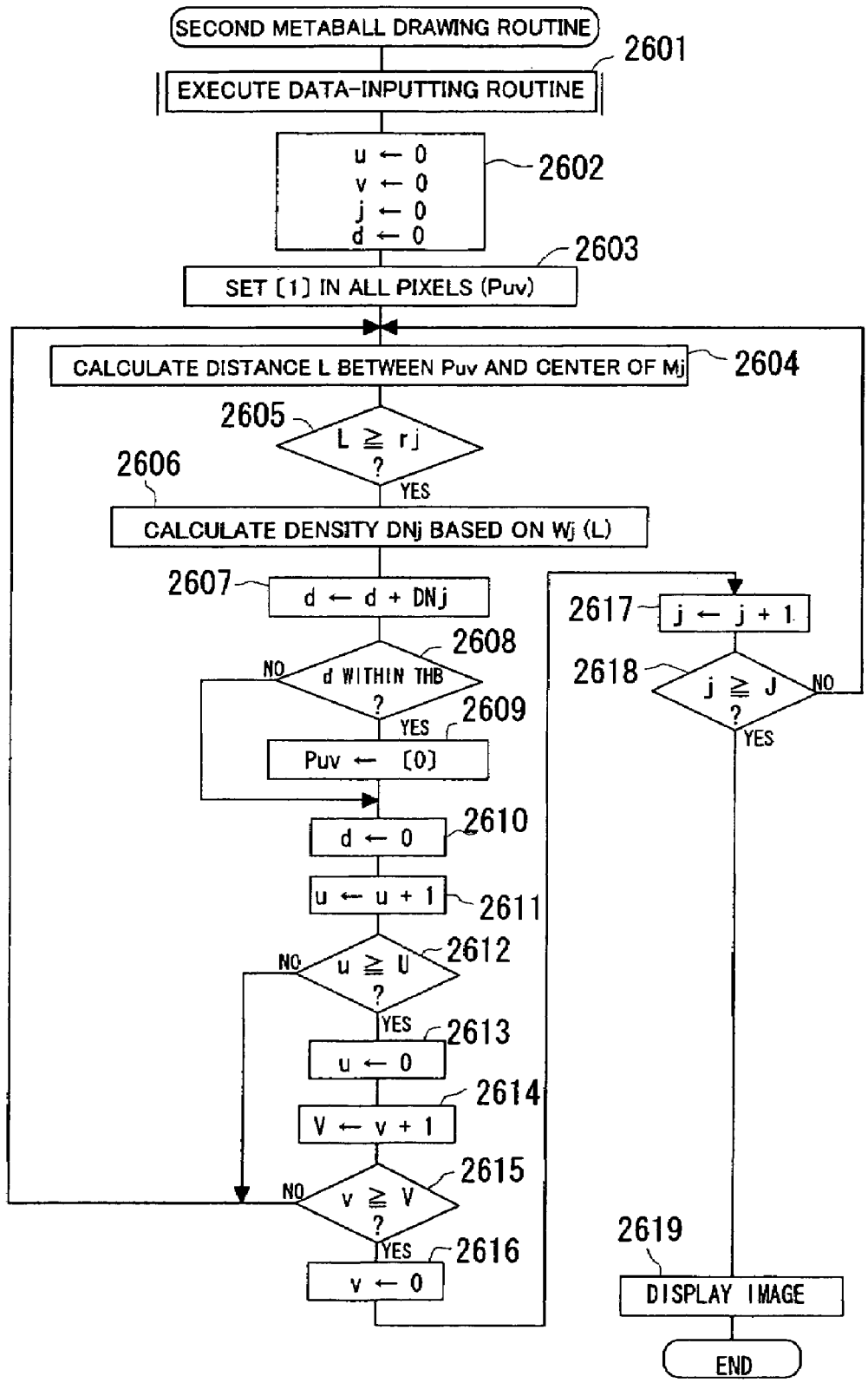
FIG. 26 is a flowchart of a second metaball drawing routine, which is executed in the system control unit shown in FIG. 10, showing a second embodiment of the metaball drawing method according to the present invention.

FIG. 26 shows a flowchart of a second metaball drawing routine, which is executed in the system control unit 10, showing a second embodiment of the metaball drawing method according to the present invention.

At step 2601, a data-inputting routine is executed as a sub-routine. During the execution of the data-inputting routine, X-Y coordinates of metaballs ($M_j$), density distribution functions ($W_j(L)$) representing the respective metaballs ($M_j$), a threshold band THB to be set with respect to the density distribution functions ($W_j(L)$) and so on are input to the system control unit 10 through a manipulation of the keyboard 14.

Otherwise, the data ($M_j$, $W_j(L)$, THB and so on) may be input to the system control unit 10 by clicking the mouse 16 on various data items displayed on the screen of the display unit 12.

After the inputting of the data ($M_j$, $W_j(L)$, THB and so on) to the system control unit 10 is completed, the control proceeds to step 2602, in which counters u, v and j are initialized to "0", and a variable d is initialized to "0".

Then, at step 2603, a background luminance value [1] is set in all the U×V pixels ($P_{uv}$). In this embodiment, the background luminance value [1] may be a black level.

At step 2604, a pixel $P_{uv}$ is read from the bitmap memory 22 (see: FIG. 11), and a distance L between the pixel $P_{uv}$ and the center of the metaball $M_j$ is calculated in the manner as shown in FIG. 3. Then, at step 2605, it is determined whether the distance L is equal to or smaller than the radius $r_j$ of the metaball $M_j$, i.e. it is determined whether the pixel $P_{uv}$ is included in the metaball $M_j$.

When the pixel $P_{uv}$ is included in the metaball $M_j$, the control proceeds to step 2606, in which a density $DN_j$ at the pixel $P_{uv}$ is calculated based on the density distribution function $W_j(L)$. Then, at step 2607, the calculated density $DN_j$ is set as density data in the variable d by the following calculation:

$$d \leftarrow d + DN_j$$

At step 2608, it is determined whether the density data d falls within the threshold band THB. When the density data d falls within the threshold band THB, the control proceeds to step 2609, in which a luminance value [0] is set in the pixel $P_{uv}$. In this embodiment, the luminance value [0] may be a white level. When the density data d does not fall within the threshold band THB, the control skips to step 2610. At either event, at step 2610, the variable d is initialized to "0".

At step 2611, a count number of the counter u is incremented by "1". Then, at step 2612, it is monitored whether the count number of the counter u has reached "U" (see: FIG. 11). When the count number of the counter u has not reached "U", the control returns to step 2604. The routine comprising steps 2604 to 2612 is repeated until the count number of the counter u has reached "U" (step 2612).

At step 2612, when the count number of the counter u has reached "U", the control proceeds to step 2613, in which the counter u is initialized to "0".

At step 2614, a count number of the counter v is incremented by "1". Then, at step 2615, it is monitored whether the count number of the counter v has reached "V" (see: FIG. 11).

When the count number of the counter v has not reached "V", the control returns to step 2604. The routine comprising steps 2604 to 2615 is repeated until the count number of the counter v has reached "V" (step 2615).

At step 2615, when the count number of the counter v has reached "V", i.e. when the reading of all the pixels ($P_{uv}$) from the bitmap memory 22 (see: FIG. 11) has been completed, the control proceeds to step 2616, in which the counter v is initialized to "0".

At step 2617, a count number of the counter j is incremented by "1". Then, at step 2618, it is monitored whether the count number of the counter j has reached "J", which is the total number of the metaballs ($M_j$) defined on the screen of the display unit 12. When the count number of the counter j has not reached "J", the control returns to step 2604.

Namely, the routine comprising steps 2604 to 2618 is repeated until the count number of the counter j has reached "J". In short, the reading of all the pixels ($P_{uv}$) from the bitmap memory 22 (see: FIG. 11) is again carried out, and it is determined whether each of the read pixels ($P_{uv}$) is included in the metaball $M_j$.

At step 2618, when the count number of the counter j has reached "J", the control proceeds to step 2619, in which a 2-dimensional image is displayed as a binary image on the screen of the display unit 12 based on all the processed pixels $P_{uv}$) Namely, each of the processed pixels is developed on the screen of the display unit 12.

Note, in the above-mentioned second embodiment, although only one of the threshold band THB is used, it should be understood that more than one threshold band may be set with respect to the metaballs ($M_j$).

In the aforesaid first metaball drawing routine of FIG. 12, a pixel $P_{uv}$ is only once read from the bitmap memory 22 (see: FIG. 11), and it is determined whether the read pixel $P_{uv}$ is included in the individual metaballs ($M_j$). On the contrary, in the second metaball drawing routine of FIG. 26, whenever a metaball $M_j$ is renewed (step 2617), all the pixels ($P_{uv}$) are read from the bitmap memory 22 (see: FIG. 11), and it is determined whether each of pixels ($P_{uv}$) is included in the renewed metaball $M_j$.

In this connection, the second metaball drawing routine of FIG. 26 is different from the first metaball drawing routine of FIG. 12, but the 2-dimensional image obtained by the execution of the second metaball drawing routine of FIG. 26 is essentially the same as that obtained by the execution of the first metaball drawing routine of FIG. 12. In this sense, it can be said that the second metaball drawing routine of FIG. 26 is a modification of the first metaball drawing routine of FIG. 12.

Figure 27:
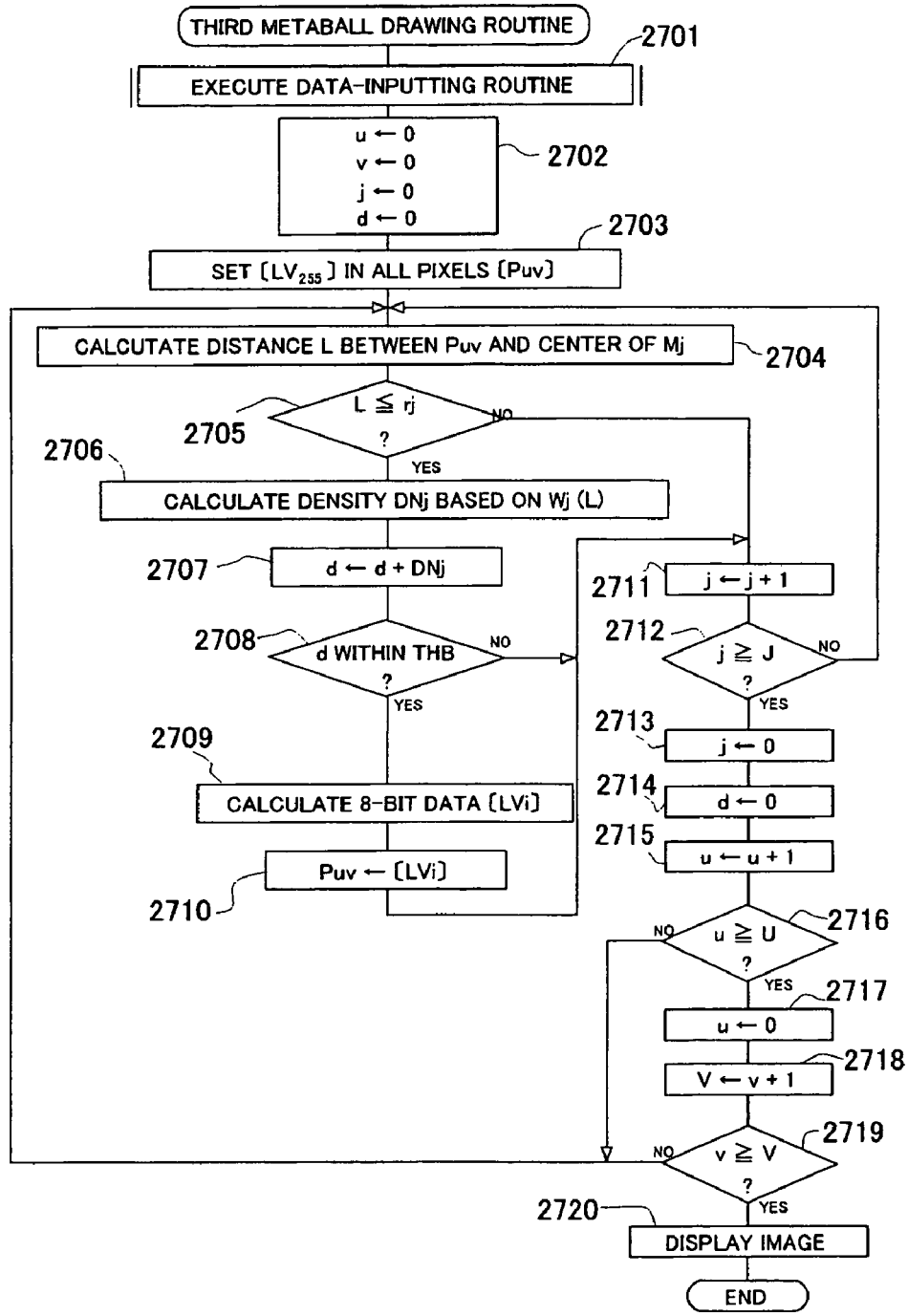
FIG. 27 is a flowchart of a third metaball drawing routine, which is executed in the system control unit shown in FIG. 10, showing a third embodiment of the metaball drawing method according to the present invention.

FIG. 27 shows a flowchart of a third metaball drawing routine, which is executed in the system control unit 10, showing a third embodiment of the metaball drawing method according to the present invention.

At step 2701, a data-inputting routine is executed as a sub-routine. During the execution of the data-inputting routine, X-Y coordinates of metaballs ($M_j$); density distribution functions ($W_j(L)$) representing the respective metaballs ($M_j$) a density conversion function F(d) for converting a density, obtained from each of the density distribution functions ($W_j(L)$), into a luminance value; a threshold band THB to be set with respect to the density distribution functions ($W_j(L)$); and so on are input to the system control unit 10 through a manipulation of the keyboard 14.

Otherwise, the data ($M_j$, $W_j(L)$, F(d), THB and so on) may be input to the system control unit 10 by clicking the mouse 16 on various data items displayed on the screen of the display unit 12.

After the inputting of the data ($M_j$, $W_j$ (L), F(d), THB and soon) to the system control unit 10 is completed, the control proceeds to step 2702, in which counters u, v and j are initialized to "0", and a variable d is initialized to "0".

Then, at step 2703, a background luminance value, which is represented by 8-bit data [$LV_{255}$] ($0 \leq i \leq 255$), is set in all the U×V pixels ($P_{uv}$). In this embodiment, the background luminance value [$LV_{255}$] may be a black level.

At step 2704, a pixel $P_{uv}$ is read from the bitmap memory 22 (see: FIG. 11), and a distance L between the read pixel $P_{uv}$ and the center of the metaball $M_j$ is calculated in the manner as shown in FIG. 3. Then, at step 2705, it is determined whether the distance L is equal to or smaller than the radius $r_j$ of the metaball $M_j$, i.e. it is determined whether the pixel $P_{uv}$ is included in the metaball $M_j$.

When the pixel $P_{uv}$ is included in the metaball $M_j$, the control proceeds to step 2706, in which a density $DN_j$ at the pixel $P_{uv}$ is calculated based on the density distribution function $W_j$ (L). Then, at step 2707, the calculated density $DN_j$ is set as density data in the variable d by the following calculation:

$$d \leftarrow d + DN_j$$

At step 2708, it is determined whether the density data d falls within the threshold band THB.

When the density data d falls within the threshold band THB, the control proceeds to step 2709, in which 8-bit data [$LV_i$] is calculated as a luminance value based on the density data d and the density conversion function F(d). Then, at step 2710, the 8-bit data [$LV_i$] is set in the pixel $P_{uv}$, and the control proceeds to step 2711.

Also, at step 2705, when the pixel $P_{uv}$ is not included in the metaball $M_j$, or, at step 2708, when the density data d does not fall within the threshold band THB, the control proceeds to step 2711.

At step 2711, a count number of the counter j is incremented by "1". Then, at step 2712, it is monitored whether the count number of the counter j has reached "J", which is the total number of the metaballs ($M_j$) defined on the screen of the display unit 12. When the count number of the counter j has not reached "J", the control returns to step 2704. Namely, the routine comprising steps 2704 to 2712 is repeated until the count number of the counter j has reached "J" (step 2712). In other words, it is determined whether the pixel $P_{uv}$ is included in all the individual metaballs ($M_j$).

At step 2712, when the count number of the counter j has reached "J", the control proceeds to step 2713, in which the counter j is initialized to "0". Then, at step 2714, the variable d is initialized to "0".

At step 2715, a count number of the counter u is incremented by "1". Then, at step 2716, it is monitored whether the count number of the counter u has reached "U" (see: FIG. 11). When the count number of the counter u has not reached "U", the control returns to step 2704. Namely, the routine comprising steps 2704 to 2716 is again repeated until the count number of the counter u has reached "U" (step 2716).

At step 2716, when the count number of the counter u has reached "U", the control proceeds to step 2717, in which the counter u is initialized to "0".

At step 2718, a count number of the counter v is incremented by "1". Then, at step 2719, it is monitored whether the count number of the counter v has reached "V" (see: FIG. 11). When the count number of the counter v has not reached "V", the control returns to step 2704. Namely, the routine comprising steps 2704 to 2719 is repeated until the count number of the counter v has reached "V" (step 2719).

At step 2719, when the count number of the counter v has reached "V", i.e. when the reading of all the pixels ($P_{uv}$) from the bitmap memory 22 (see: FIG. 11) has been completed, the control proceeds to step 2720, in which a 2-dimensional image is displayed as a gradation image on the screen of the display unit 12 based on the processed pixels ($P_{uv}$). Namely, each of the processed pixels is developed on the screen of the display unit 12.

Note, in the above-mentioned third embodiment, although only one of the threshold band THB is used, it should be understood that more than one threshold band may be set with respect to the metaballs ($M_j$).

Figure 28:
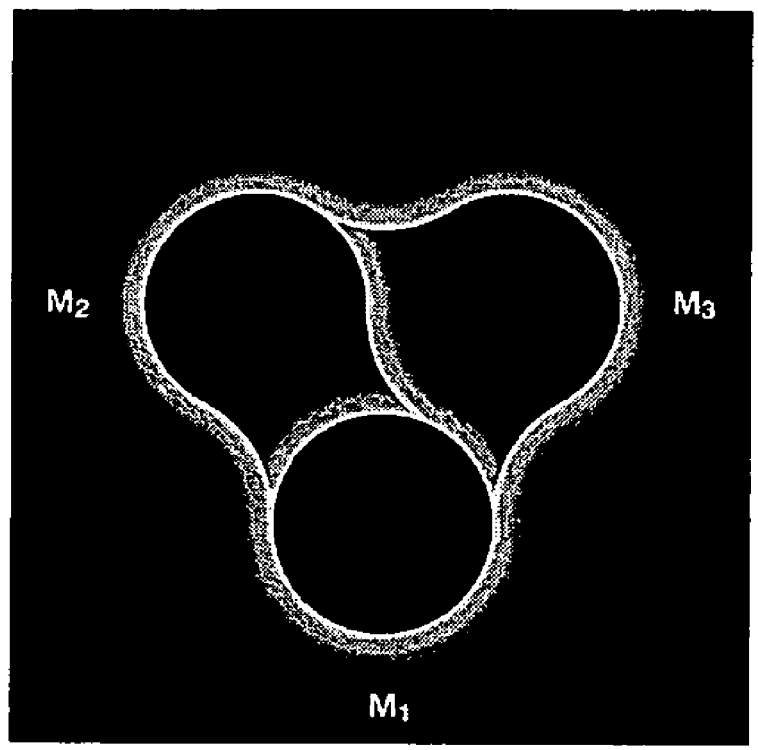
FIG. 28 is an explanatory view showing by way of example still yet another 2-dimesional gradation image obtained by the third metaball drawing routine of FIG. 27.

FIG. 28 shows a 2-dimesional gradation image by way of example, which is obtained by the execution of the third metaball drawing routine of FIG. 27. In this example, the gradation image is drawn and displayed based on three metaballs $M_{(j=1)}$, $M_{(j=2)}$ and $M_{(j=3)}$.

In the example of FIG. 28, as is apparent from steps 2706 to 2710 of FIG. 27, when a pixel $P_{uv}$ is included in only the metaball $M_1$, and when density data d ($DN_1$), which is calculated based on the density distribution function $W_1$ (L), falls within the threshold band THB, 8-bit data [$D_{(i=\alpha)}$], which is calculated based on the density data d ($DN_1$) and the density conversion function F(d), is set in the pixel $P_{uv}$. Note, the 8-bit data [$D_{(\alpha)}$] is the luminance value corresponding to the density data d ($DN_1$).

Figure 29:
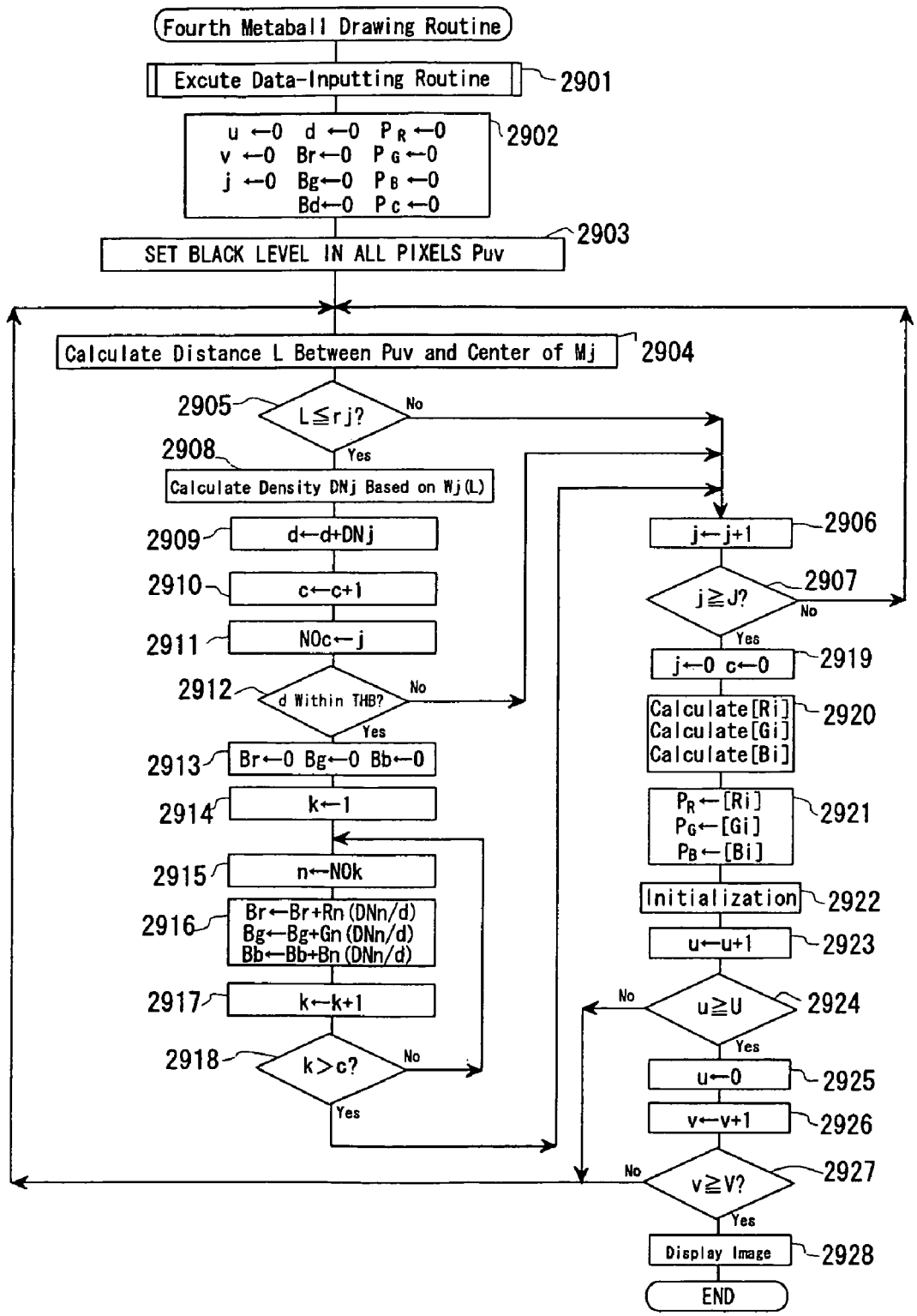
FIG. 29 is a flowchart of a fourth metaball drawing routine, which is executed in the system control unit shown in FIG. 10, showing a fourth embodiment of the metaball drawing method according to the present invention.

Also, in the example of FIG. 29, as is apparent from steps 2706 to 2710 of FIG. 27, when a pixel $P_{uv}$ is included in only the two metaball $M_1$ and $M_2$, and when density data d ($DN_1 + DN_2$), which is calculated based on the density distribution functions $W_1$ (L) and $W_2$ (L), falls within the threshold band THB, 8-bit data [$D_{(i=\beta)}$], which is calculated based on the density data d ($DN_1 + DN_2$) and the density conversion function F(d), is set in the pixel $P_{uv}$. Note, the 8-bit data [$D_{(\beta)}$] is the luminance value corresponding to the density data d ($DN_1 + DN_2$).

Further, in the example of FIG. 28, as is apparent from steps 2706 to 2710 of FIG. 27, when a pixel $P_{uv}$ is included in only the three metaballs $M_1$, $M_2$ and $M_3$, and when density data d ($DN_1 + DN_2 + DN_3$), which is calculated based on the density distribution functions $W_1$ (L), $W_2$ (L) and $W_3$ (L), falls within the threshold band THB, 8-bit data [$D_{(i=\gamma)}$], which is calculated based on the density data d ($DN_1 + DN_2 + DN_3$) and the density conversion function F(d), is set in the pixel $P_{uv}$. Note, the 8-bit data [$D_{(\gamma)}$] is the luminance value corresponding to the density data d ($DN_1 + DN_2 + DN_3$).

In short, as is apparent from FIG. 28, an outline of the image, which is derived from the three metaballs $M_1$, $M_2$ and $M_3$, is drawn prior to the other outlines of the images derived from the metaball $M_1$ and the metaballs $M_1$ and $M_2$. Namely, the outline of the image, which is derived from the three metaballs $M_1$, $M_2$ and $M_3$, can be viewed as being embossed.

FIG. 29 shows a flowchart of a fourth metaball drawing routine, which is executed in the system control unit 10, showing a fourth embodiment of the metaball drawing method according to the present invention. Note, in this fourth embodiment of the metaball drawing method, a color image is drawn and displayed on the screen of the display unit 12.

At step 2901, a data-inputting routine is executed as a sub-routine. During the execution of the data-inputting routine, X-Y coordinates of metaballs ($M_j$); density distribution functions ($W_j$(L)) representing the respective metaballs ($M_j$); a set of 8-bit red data $R_j$, 8-bit green data $G_j$ and 8-bit blue data $B_j$ to be assigned to each of the metaballs ($M_j$); red, green and blue density conversion functions F($B_r$), F($B_g$) and F($B_b$) for displaying a color image on the screen of the display unit 12;

a threshold band THB to be set with respect to the density distribution functions ($W_j(L)$); and so on are input the system control unit 10 through a manipulation of the keyboard 14.

In this fourth embodiment, a color is assigned to each of the metaballs ($M_j$) based on the set of 8-bit red data $R_j$, 8-green data $G_j$ and 8-bit blue data $B_j$. For example, when $R_j$=[255], $G_j$=[255] and $B_j$=[255], white is assigned to the metaball $M_j$. When $R_j$=[0], $G_j$=[0] and $B_j$=[0], black is assigned to the metaball $M_j$. When $R_j$=[127], $G_j$=[127] and $B_j$=[127], 50% gray is assigned to the metaball $M_j$. When $R_j$=[255], $G_j$=[0] and $B_j$=[0], red is assigned to the metaball $M_j$. When $R_j$=[0], $G_j$=[255] and $B_j$=[0], green is assigned to the metaball $M_j$. When $R_j$=[0], $G_j$=[0] and $B_j$=[255], blue is assigned to the metaball $M_j$. When $R_j$=[255], $G_j$=[241] and $B_j$=[0], yellow is assigned to the metaball $M_j$. When $R_j$=[225], $G_j$=[0] and $B_j$=[127], magenta is assigned to the metaball $M_j$. When $R_j$=[0], $G_j$=[160] and $B_j$=[233], cyan is assigned to the metaball $M_j$.

After the inputting of the data ($M_j$, $W_j(L)$, $R_j$, $G_j$, $B_j$, $F(B_r)$, $F(B_g)$, $F(B_b)$, THB and so on) to the system control unit 10 is completed, the control proceeds to step 2902, in which counters u, v, j and c are initialized to "0", and variables d, $B_r$, $B_g$, $B_b$, $P_R$, $P_G$ and $P_B$ are initialized to "0".

Then, at step 2903, a set of 8-bit red density data [$R_{i=0}$], 8-bit green density data [$G_{i=0}$] and 8-bit blue density data [$G_{i=0}$] ($0 \leq i \leq 255$) are set in all the U×V pixels ($P_{uv}$). Namely, in this embodiment, a black level is set as a background luminance value.

At step 2904, a pixel $P_{uv}$ is read from the bitmap memory 22 (see: FIG. 11), and a distance L between the read pixel $P_{uv}$ and the center of the metaball $M_j$ is calculated in the manner as shown in FIG. 3. Then, at step 2905, it is determined whether the distance L is equal to or smaller than the radius $r_j$ of the metaball $M_j$, i.e. it is determined whether the pixel $P_{uv}$ is included in the metaball $M_j$.

When the pixel $P_{uv}$ is not included in the metaball $M_j$, the control proceeds to step 2906, in which a count number of the counter j is incremented by "1". Then, at step 2907, it is monitored whether the count number of the counter j has reached "J", which is the total number of the metaballs ($M_j$) defined on the screen of the display unit 12. When the count number of the counter j has not reached "J", the control returns to step 2904. Namely, the routine comprising steps 2904 to 2907 is repeated until the metaball $M_j$, in which the pixel $P_{uv}$ is included (step 2905), has been found.

At step 2905, when the metaball $M_j$, in which the pixel $P_{uv}$ is included (step 2905), has been found, the control proceeds from step 2905 to step 2908, in which a density $DN_j$ at the pixel $P_{uv}$ is calculated based on the density distribution function $W_j(L)$. Then, at step 2909, the calculated density $DN_j$ is set as density data in the variable d by the following calculation:

$$d \leftarrow d + DN_j$$

At step 2910, a count number of the counter c is incremented by "1". Note, the counter c indicates a number of the metaballs ($M_j$) in which the pixel $P_{uv}$ concerned is included. Then, at step 2911, the ordinal number j of the metaball $M_j$, in which the pixel $P_{uv}$ concerned is included, is set to a variable $No_c$. Next, at step 2912, it is determined whether the density data d falls within the threshold band THB.

When the density data d does not fall within the threshold band THB, the control proceeds to step 2906, in which a count number of the counter j is incremented by "1". Then, at step 2907, it is monitored whether the count number of the counter j has reached "J". When the count number of the counter j has not reached "J", the control returns to step 2904. Namely, the routine comprising steps 2904 to 2912 is repeated until the metaball $M_j$, in which the density data d has fallen within the threshold band THB (step 2912).

At step 2912, when the density data d has fallen within the threshold band THB, the control proceeds to step 2913, the variables $B_r$, $B_g$ and $B_b$ are initialized to "0". Then, at step 2914, a counter k is set to "1", and, at step 2915, a variable n is set to the variable $NO_k$. Namely, provided that the density data d has fallen within the threshold band THB (step 2912), the counter k indicates the number of the metaballs ($M_j$), in which the pixel $P_{uv}$ concerned is included, and the variable n indicates the ordinal number j of the metaball $M_j$, in which the pixel $P_{uv}$ concerned is included.

At step 2916, the following calculations are carried out:

$$B_r \leftarrow B_r + R_n(DN_n/d)$$

$$B_g \leftarrow B_g + G_n(DN_n/d)$$

$$B_b \leftarrow B_b + B_n(DN_n/d)$$

At step 2917, a count number of the counter k is incremented by "1". Then, at step 2918, it is monitored whether the count number of the counter k becomes more than "c".

When the count number of the counter k has not become more than "c", the control returns to step 2915. Namely, the routine comprising steps 2915 to 2918 is repeated until the count number of the counter k becomes more than c (step 2918).

At step 2918, when the count number of the counter k becomes more than c, the control proceeds to step step 2906, in which a count number of the counter j is incremented by "1". Then, at step 2907, it is monitored whether the count number of the counter j has reached "J". When the count number of the counter j has not reached "J", the control returns to step 2904. Namely, the routine comprising steps 2904 to 2918 is repeated until the count number of the counter j has reached "J".

In short, during the repetition of the routine comprising steps 2904 to 2918, for example, when the pixel $P_{00}$ are included in the metaballs $M_2$ and $M_5$ (step 2905), the density data d is calculated as the total of the densities $DN_2$ and $DN_5$ (step 2909). When the density data d ($DN_2+DN_5$) falls within the threshold band THB (step 2912), the variable $B_r$ (i.e., the red density component), the variable $B_g$ (i.e., the green density component) and the variable $B_b$ (i.e., the blue density component) at the pixel $P_{00}$ are calculated as follows (step 2916):

$$B_r = R_2(DN_2/d) + R_5(DN_5/d)$$

$$B_g = G_2(DN_2/d) + G_5(DN_5/d)$$

$$B_b = B_2(DN_2/d) + B_5(DN_5/d)$$

Also, for example, when the pixel $P_{00}$ is further included in the metaball $M_8$ as the total of the densities $DN_2$ and $DN_5$ (step 2909), the density data d is calculated as the total of the densities $DN_2$, $DN_5$ and $DN_8$ (step 2909). When the density data d ($DN_2+DN_5+DN_8$) falls within the threshold band THB (step 2912), the previously calculated red density component $B_r$, green density component $B_g$ and blue density component $B_b$ are canceled (step 2913). Then, the red, green and blue density components $B_r$, $B_g$ and $B_b$ are renewed by the following calculations (step 2916):

$$B_r = R_2(DN_2/d) + R_5(DN_5/d) + R_8(DN_8/d)$$

$$B_g = G_2(DN_2/d) + G_5(DN_5/d) + G_8(DN_8/d)$$

$$B_b = B_2(DN_2/d) + B_5(DN_5/d) + B_8(DN_8/d)$$

In either event, at step 2907, when the count number of the counter j has reached "J", the control proceeds from step 2907 to step 2919, in which the counters j and c are initialized to "0".

At step 2920, 8-bit red density data [$R_i$] ($0 \leq i \leq 255$) is calculated based on the red density data $B_r$ and the red density conversion function $F(B_r)$, 8-bit green density data [$G_i$] ($0 \leq i \leq 255$) is calculated based on the green density data $B_g$ and the green density conversion function $F(B_g)$, and 8-bit blue density data [$B_i$] ($0 \leq i \leq 255$) is calculated based on the blue density data $B_b$ and the green density conversion function $F(B_b)$. Then, at step 2921, the 8-bit data [$R_i$] is set in the variable $P_R$, the 8-bit data [$G_i$] is set in the variable $P_G$, and the 8-bit data [$B_i$] is set in the variable $P_B$. Note, the variables $P_R$, $P_G$ and $P_B$ represent a luminance value of the pixel $P_{uv}$.

At step 2922, the variables d, $B_r$, $B_g$, $B_r$, $P_R$, $P_G$ and $P_B$ are initialized to "0".

At step 2923, a count number of the counter u is incremented by "1". Then, at step 2924, it is monitored whether the count number of the counter u has reached "U" (see: FIG. 11). When the count number of the counter u has not reached "U", the control returns to step 2904. Namely, the routine comprising steps 2904 to 2924 is repeated until the count number of the counter u has reached "U" (step 2924).

At step 2924, when the count number of the counter u has reached "U", the control proceeds to step 2925, in which the counter u is initialized to "0". Then, at step 2926, a count number of the counter v is incremented by "1". Next, at step 2927, it is monitored whether the count number of the counter v has reached "V" (see: FIG. 11). When the count number of the counter v has not reached "V", the control returns to step 2904. Namely, the routine comprising steps 2904 to 2927 is repeated until the count number of the counter v has reached "V" (step 2927).

At step 2927, when the count number of the counter v has reached "V", i.e. when the reading of all the pixels ($P_{uv}$) from the bitmap memory 22 (see: FIG. 11) has been completed, the control proceeds to step 2928, in which a 2-dimensional color image is displayed as a color gradation image on the screen of the display unit 12 based on the variables $P_R$, $P_G$ and $P_B$ representing the pixels ($P_{uv}$)

Note, in the above-mentioned fourth embodiment, although only the threshold band THB is used, it should be understood that more than one threshold band may be set with respect to the metaballs ($M_j$).

Figure 30:
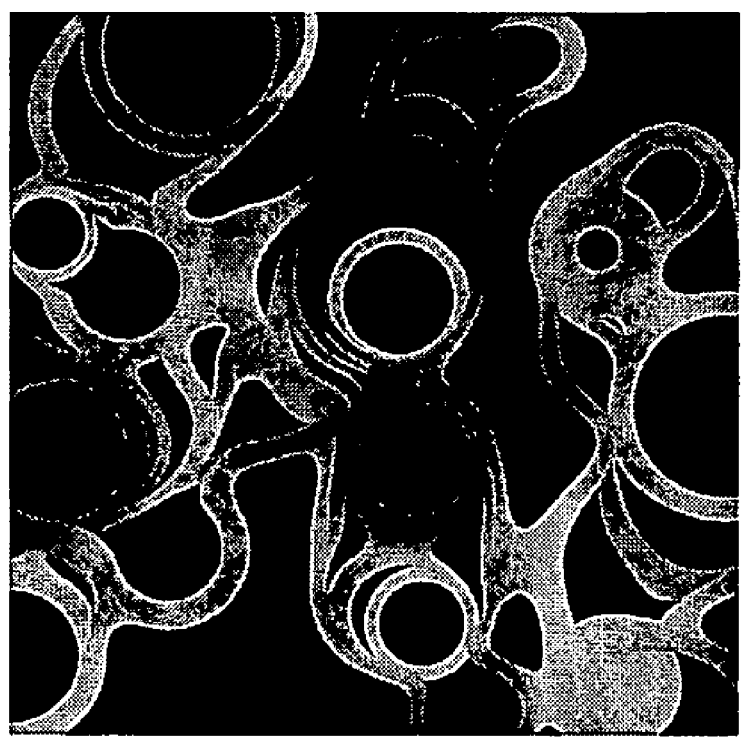
FIG. 30 is an explanatory view showing byway of example a 2-dimesional color image obtained by the fourth metaball drawing routine of FIG. 29.

FIG. 30 shows by way of example a 2-dimensional color image which is obtained by the execution of the fourth metaball drawing routine (FIG. 29) according to the present invention when a plurality of metaballs ($M_j$) are defined and arranged at random on the screen of the monitor 12. As shown in FIG. 30, it is possible to obtain an attractive colorful image.

In the fourth embodiment of the metaball drawing method shown in FIG. 29, at least one of the metaballs ($M_j$) may be represented by a density distribution function $W_j$(L) having a negative density distribution. In this case, it is possible to develop an unexpected chromatic color as stated below.

Figure 31A:
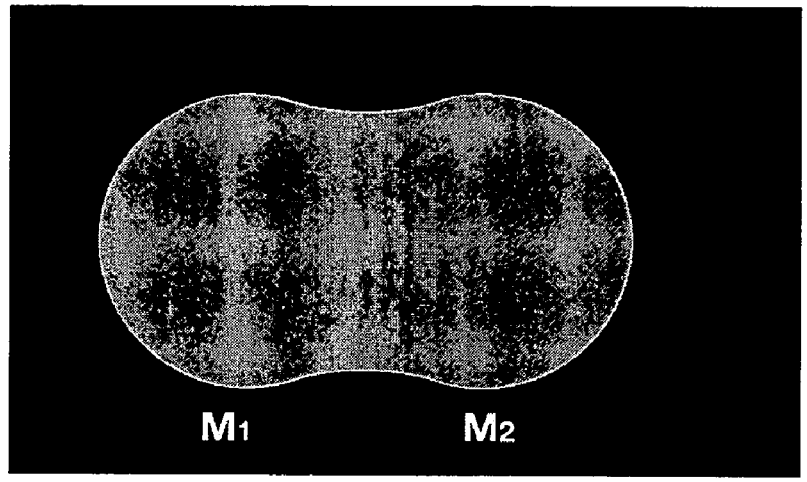
FIG. 31A is an explanatory view showing by way of example a gourd-like shape image, based on gray and green metaballs.

For example, FIG. 31A shows a gourd-like shape image which is obtained when gray and green metaballs $M_1$ and $M_2$ each having a positive density distribution are defined and arranged on the screen of the display unit 12 so as to partially overlap with each other. In this gourd-like shape image, an circular area, which derived from the gray metaball $M_1$, is developed with gray, an circular area, which is derived from the green metaball $M_2$, is developed with green, and an overlapped area between the metaballs $M_1$ and $M_2$ is developed with a mixture of gray and green.

Figure 31B:
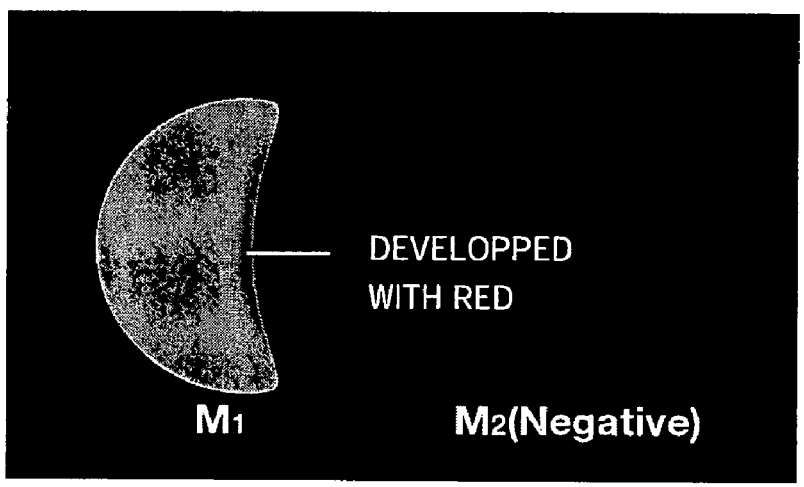
FIG. 31B is an explanatory view showing by way of example a crescent image which is obtained when a negative density distribution is given to the green metaball of FIG. 31A, with a part of the crescent image being developed with red.

FIG. 31B shows a crescent image which is obtained as a distorted image when a negative density distribution is given to the green metaball $M_2$. In this crescent image, the overlapped area between the metaballs $M_1$ and $M_2$ is developed with a red, which is a complementary color of the green. Namely, although the gray and green metaballs $M_1$ and $M_2$ partially overlap with each other, the overlapped area is developed with the unexpected red.

Figure 31C:
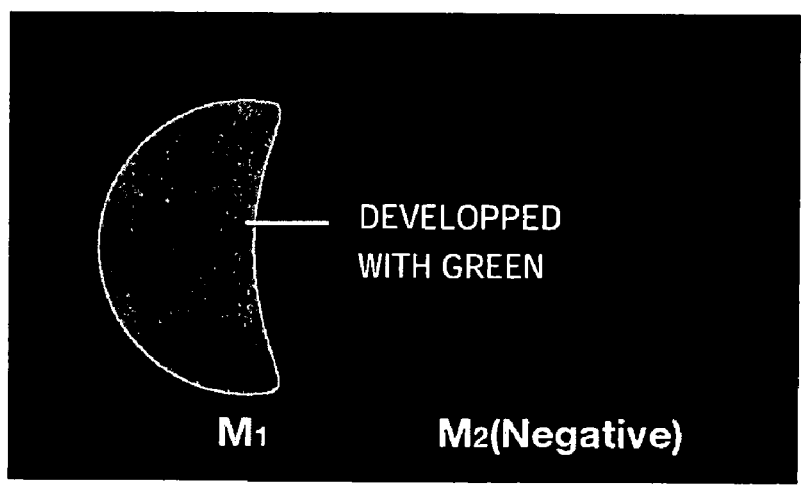
FIG. 31C is an explanatory view showing by way of example a crescent image which is obtained when the negative density distribution is given to the green metaball of FIG. 31A, with a part of the crescent image being developed with green.

Optionally, as shown in FIG. 31C, the overlapped area can be developed with green, which is derived from the green metaball $M_2$, provided that an absolute value of $DN_j$ is used at step 2909 of the fourth metaball drawing routine of FIG. 29. In this case, it is necessary to use another variable d' for carrying out a calculation (d'←d'+$DN_j$) at step 2909, before the distorted image based on the negative density distribution can be obtained.

Figure 32A:
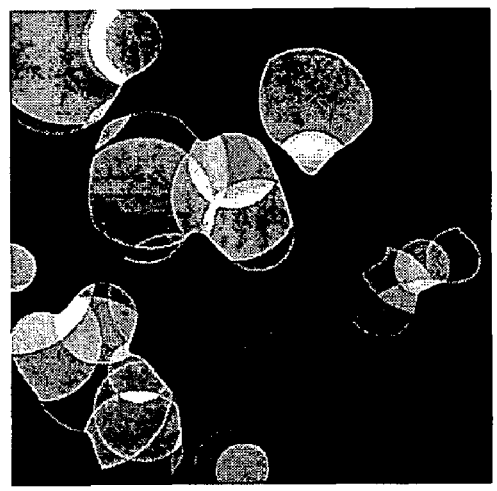
FIGS. 32A and 32B are explanatory views showing by way of example 2-dimensional color images which are obtained by a modification of the fourth metaball drawing routine of FIG. 29.
Figure 32B:
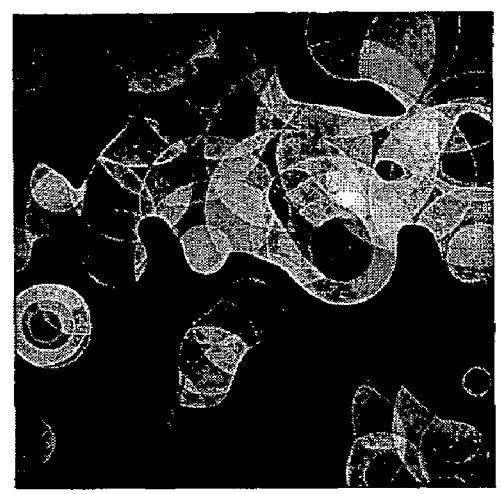

In the fourth metaball drawing routine of FIG. 29, step 2913 may be omitted. In this modified metaball drawing routine, it is possible to draw an image in a transparent manner as shown in FIGS. 32A and 32B by way of example. Namely, the red density components $B_r$, green density components $B_g$ and blue density components $B_b$ are increasingly added one after another due to the omission of step 2913, and thus an addition effect of the density components is obtained, resulting in the drawing of the image in the transparent manner, as shown in FIGS. 32A and 32B.

In another modification of the fourth metaball drawing routine of FIG. 29, the following calculations may be carried out at step 2916:

$$B_r \leftarrow B_r - R_n(DN_n/d)$$

$$B_g \leftarrow B_g - R_n(DN_n/d)$$

$$B_b \leftarrow B_b - R_n(DN_n/d)$$

Figure 33:
FIG. 33 is an explanatory view showing by way of example a 2-dimensional color image which is obtained by another modification of the fourth metaball drawing routine of FIG. 29.

In this modification, preferably, at step 2903, a set of 8-bit red density data [$R_{i=255}$], 8-bit green density data [$G_{i=255}$] and 8-bit blue density data [$B_{i=255}$] are set in all the U×V pixels ($P_{uv}$) Namely, a white level is set as the background luminance value. Also, similar to the first-mentioned modification, step 2913 is omitted. In this case, it is possible to draw an image in a transparent manner based on a subtraction effect, as shown in FIG. 33.

Figure 34:
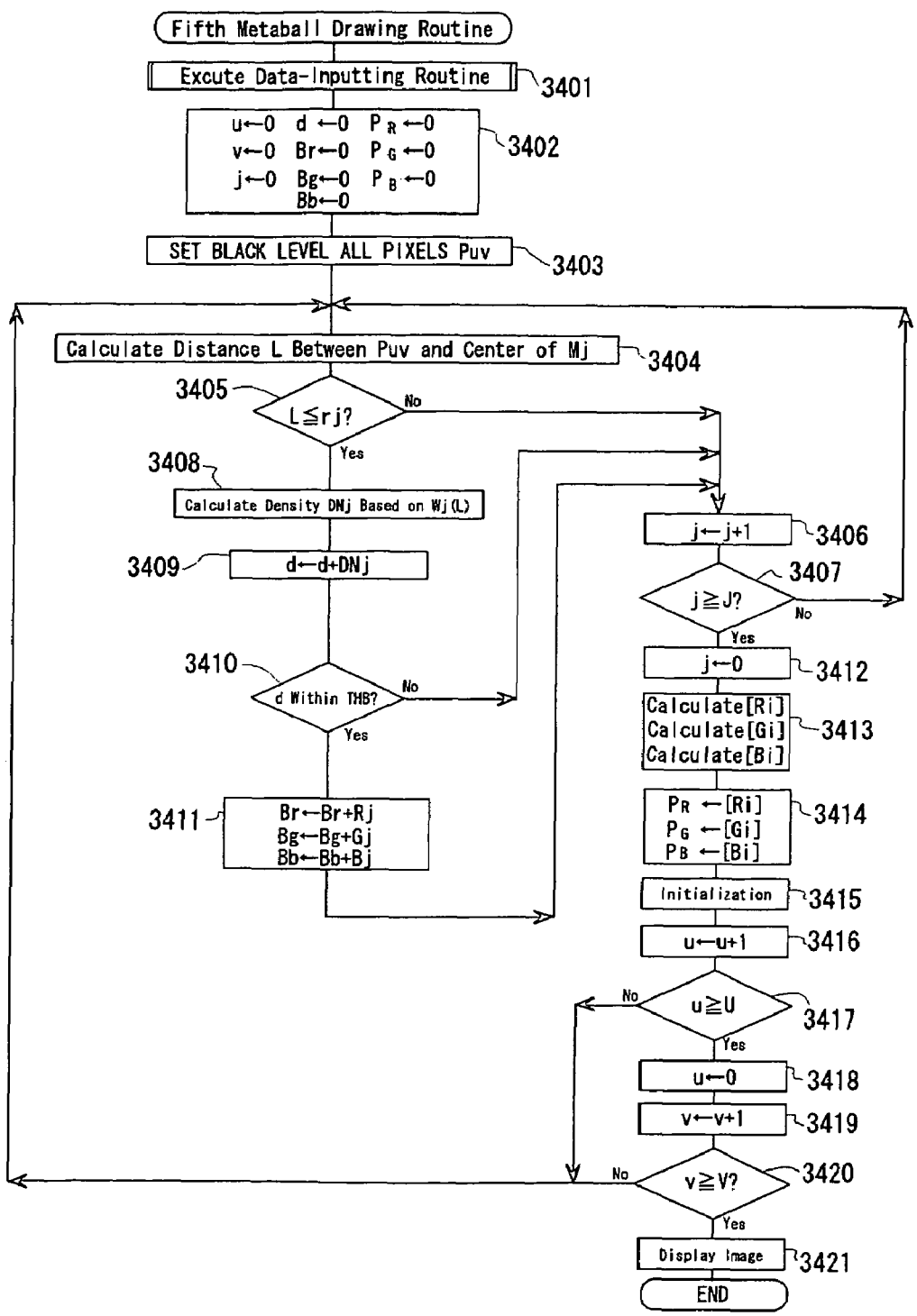
FIG. 34 is a flowchart of a fifth metaball drawing routine, which is executed in the system control unit shown in FIG. 10, showing a fifth embodimentof the metaball drawing method according to the present invention.

FIG. 34 shows a flowchart of a fifth metaball drawing routine, which is executed in the system control unit 10, showing a fifth embodiment of the metaball drawing method according to the present invention.

In this fifth metaball drawing routine, respective steps 3401 to 3409 correspond to steps 2901 to 2909 of the fourth metaball drawing routine of FIG. 29; step 3410 corresponds to step 2912 of the fourth metaball drawing routine of FIG. 29; step 3411 is substituted for steps 2913 to 2918 of the fourth metaball drawing routine of FIG. 29; and respective steps 3412 to 3421 correspond to steps 2919 to 2928.

Figure 35A:
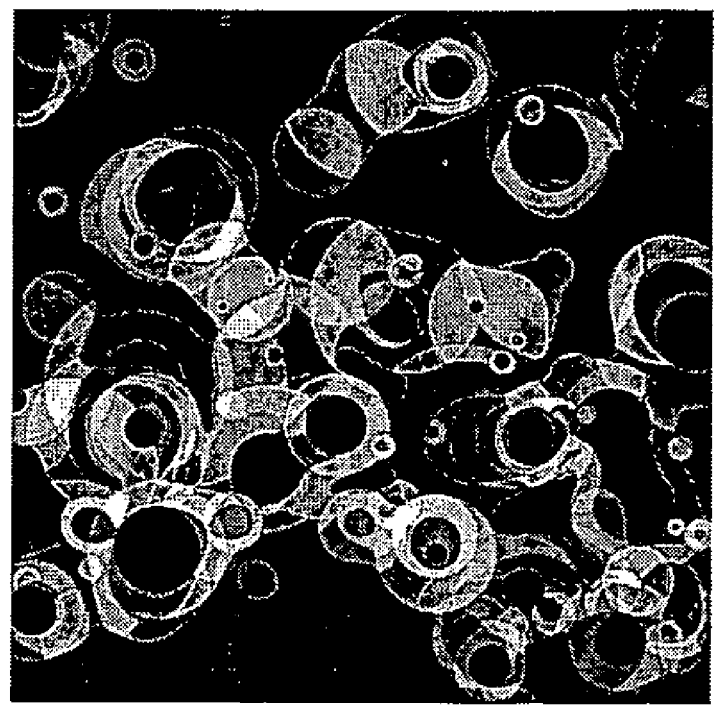
FIG. 35A is an explanatory view showing by way of example a 2-dimesional color image which is obtained by the fifth metaball drawing routine of FIG. 34.

When the fifth metaball drawing routine is executed in a similar manner of the fourth metaball drawing routine of FIG. 29, an image is drawn in a transparent manner based on the addition effect, as shown in FIG. 35A by way of example.

In a modification of the fifth metaball drawing routine of FIG. 34, the following calculations may be carried out at step 3411:

$$B_r \leftarrow B_r - R_n(DN_n/d)$$

$$B_g \leftarrow B_g - R_n(DN_n/d)$$

$$B_b \leftarrow B_b - R_n(DN_n/d)$$

Figure 35B:
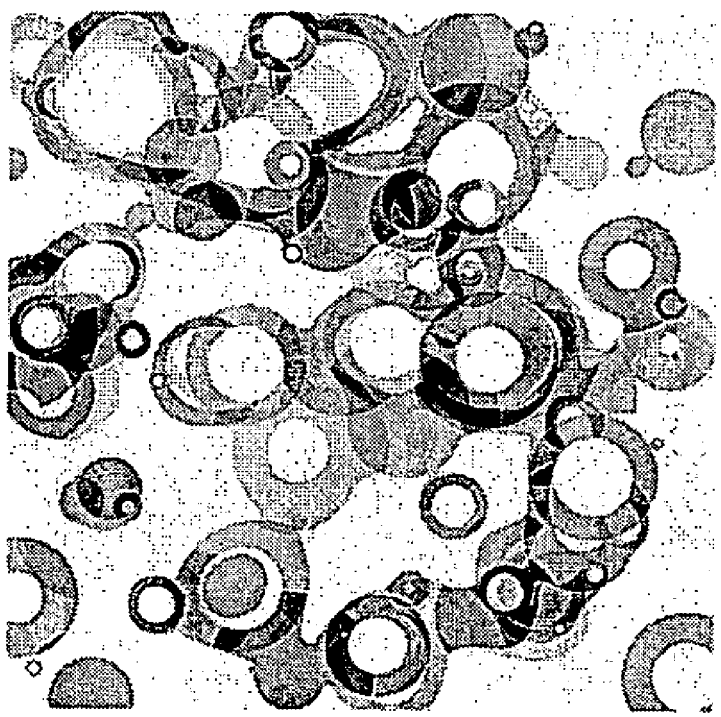
FIG. 35B is an explanatory view showing by way of example a 2-dimensional color image which is obtained by a modification of the fourth metaball drawing routine of FIG. 34.

In this modification, preferably, at step 3403, a set of 8-bit red density data [$R_{i=255}$], 8-bit green density data [$G_{i=255}$] and 8-bit blue density data [$B_{i=255}$] are set in all the U×V pixels ($P_{uv}$.) Namely, a white level is set as the background luminance value. In this case, an image is drawn in a transparent manner based on the subtraction effect, as shown in FIG. 35B by way of example.

Figure 36:
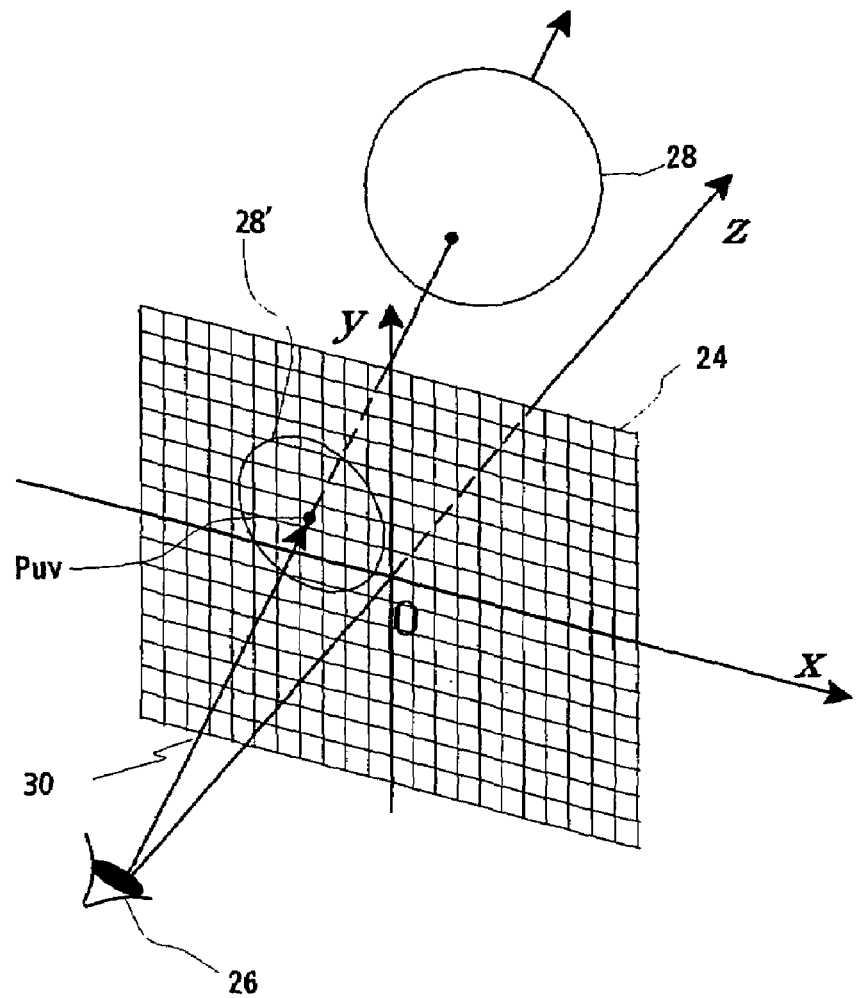
FIG. 36 is an explanatory view showing a concept of a ray-tracing method for displaying an image as a 3-dimensional image on a 2-dimensional plane.

FIG. 36 shows by way of example a concept of a prior art ray-tracing method for drawing and displaying an image as a 3-dimensional image on a 2-dimensional plane, which may be utilized in the metaball drawing method according to the present invention, so that an image can be 3-dimensionally drawn and displayed on the screen of the display unit 12.

In FIG. 36, reference 24 indicates a plane which may be the screen of the display unit 12 (see: FIG. 10), and a 3-dimensional X-Y-Z coordinate system is defined with respect to the screen 24. Also, reference 26 indicates an eye or viewpoint which is defined at a suitable position spaced apart from the surface of the screen 24, and reference 28 indicates a 3-dimensional object to be displayed on the screen 24. The 3-dimensional object is positionally defined with respect to the X-Y-Z coordinate system.

In the prior art ray-tracing method, a viewing ray 30 is generated so as to be emitted from the viewpoint 26 to pass through a pixel $P_{uv}$ on the screen 24. Then, it is determined whether the viewing ray 30 intersects with the 3-dimensional object 28. When the viewing ray 30 intersects with the 3-dimensional object 28, a normal vector is calculated at the intersection, and a given luminance value is set in the pixel $P_{uv}$ based on the normal vector. When the viewing ray 30 does not intersect with the 3-dimensional object 28, and, for example, a background luminance value (white level or black level) is set in the pixel $P_{uv}$.

By processing all the pixels ($P_{uv}$) as stated above, an image 28' can be drawn and displayed as a 3-dimensional image on the screen 24, as shown in FIG. 36.

Note, in this prior art ray-tracing method, it has been already proposed that an image is drawn and displayed as a 3-dimensinal image on the screen 24 by replacing the 3-dimensional object 28 with a metaball which is represented by a 3-dimensional density distribution.

The metaball drawing method according to the present invention can be used as a solid-texturing method for drawing patterns on a surface of a 3-dimensional object displayed on the screen of the display unit by the aforesaid ray-tracing method.

Figure 37:
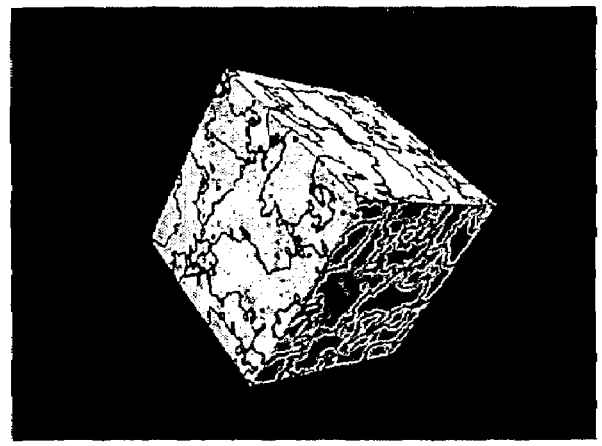
FIG. 37 is an explanatory view for explaining a prior art solid-texturing method.

Referring to FIG. 37, a cubic object is displayed on a screen of a monitor by the ray-tracing method, and textures or patterns are drawn on the surfaces of the cubic object by a prior art solid-texturing method.

Figure 38:
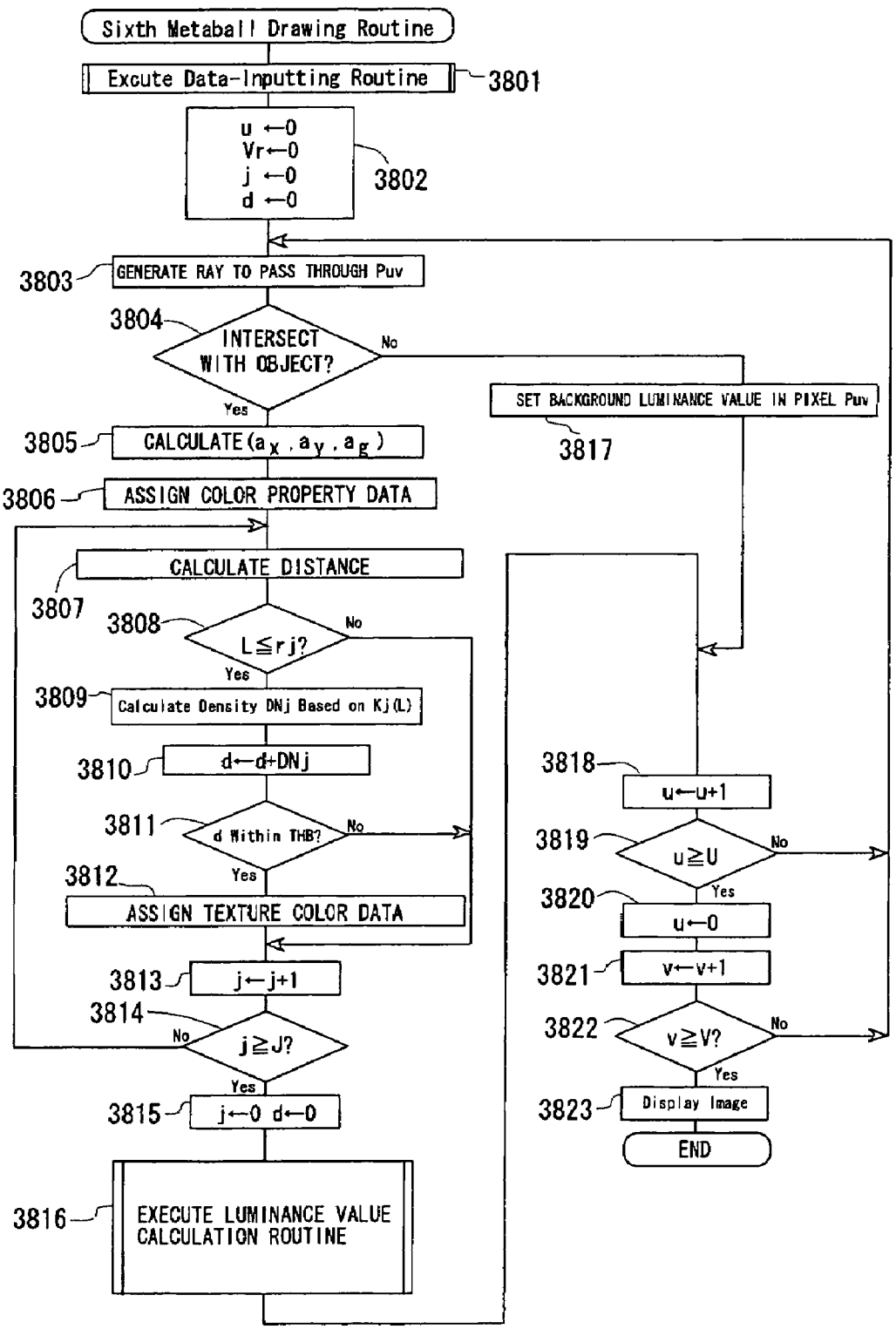
FIG. 38 is a flowchart of a sixth metaball drawing routine, which is executed in the system control unit shown in FIG. 10, showing a sixth embodiment of the metaball drawing method according to the present invention.

FIG. 38 shows a flowchart of a sixth metaball drawing routine, which is executed in the system control unit 10, showing a sixth embodiment of the metaball drawing method according to the present invention. Note, in this sixth embodiment, a 3-dimensional (X-Y-Z) coordinate system, as shown in FIG. 38, is previously defined with respect to the screen of the display unit 12.

At step 3801, a data-inputting routine is executed as a sub-routine. During the execution of the data-inputting routine, 3-dimensional coordinates of a sphere object to be displayed on the screen of the display unit, 3-dimensional coordinates of metaballs ($M_j$), 3-dimensional density distribution functions ($K_j(L)$) representing the respective metaballs ($M_j$), and a threshold band THB to be set with respect to the 3-dimensional density distribution functions ($K_j(L)$) and so on are input to the system control unit 10 through a manipulation of the keyboard 14.

Otherwise, the data ($M_j$, $K_j(L)$, THB and so on) may be input to the system control unit 10 by clicking the mouse 16 on various data items displayed on the screen of the display unit 12.

After the inputting of the data ($M_j$, $K_j(L)$, THB and so on) to the system control unit 10 is completed, the control proceeds to step 3802, in which counters u, v and j are initialized to "0", and a variable d is initialized to "0".

At step 3803, a pixel $P_{uv}$ is read from the bitmap memory 22 (see: FIG. 11), and a viewing ray (30) is generated so as to be emitted from a viewpoint (26) to pass through the read pixel $P_{uv}$. Then, at step 3804, it is determined whether the viewing ray (30) intersects with the sphere object.

When the viewing ray (30) intersects with the sphere object, the control proceeds to step 3805, 3-dimensional coordinates ($a_x$, $a_y$, $a_z$) of the intersection is calculated. Then, at step 3806, object color data is assigned to an object color property of the sphere object. The assignment of the object color data to the object color property is carried out to determine with what color a surface of the sphere object should be developed, and the object color data is previously input to the system control unit 10 during the execution of the data-inputting routine (step 3801). Note, in this sixth embodiment, the object color data may be white.

At step 3807, a distance L between the intersection ($a_x$, $a_y$, $a_z$) and the center of the metaball $M_j$ is calculated. Then, at step 3808, it is determined whether the distance L is equal to or smaller than the radius $r_j$ of the metaball $M_j$, i.e. it is determined whether the intersection ($a_x$, $a_y$, $a_z$) is included in the metaball $M_j$.

At step 3808, when the the intersection ($a_x$, $a_y$, $a_z$) is included in the metaball $M_j$, the control proceeds to step 3809, in which a density $DN_j$ at the intersection ($a_x$, $a_y$, $a_z$) is calculated based on the 3-dimensional density distribution function $K_j(L)$. Then, at step 3810, the calculated density $DN_j$ is set as density data in the variable d by the following calculation:

$$d \leftarrow d + DN_j$$

At step 3811, it is determined whether the density data d falls within the threshold band THB. When the density data d falls within the threshold band THB, the control proceeds to step 3812, in which texture color data is assigned to the object color property of the sphere object. The assignment of the texture color data to the object color property is carried out to determine with what color textures or patterns should be drawn on the surface of the sphere object, and the texture color data is previously input to the system control unit 10 during the execution of the data-inputting routine (step 3801). Note, in this sixth embodiment, the texture color data may be black. Thereafter, the control proceeds to step 3813.

On the other hand, at step 3808, when the intersection ($a_x$, $a_y$, $a_z$) is not included in the metaball $M_j$, the control skips from the step 3808 to step 3813. Also, at step 3811, when the density data d does not fall within the threshold band THB, the control skips from step 3811 to step 3813.

In either event, at step 3813, a count number of the counter j is incremented by "1". Then, at step 3814, it is monitored whether the count number of the counter j has reached "J", which is the total number of the metaballs ($M_j$) defined on the screen of the display unit 12. When the count number of the counter j has not reached "J", the control returns to step 3807. Namely, the routine comprising steps 3807 to 3814 is repeated until the count number of the counter j has reached "J". In other words, it is determined whether the intersection ($a_x$, $a_y$, $a_z$) is included in all the individual metaballs ($M_j$).

At step 3814, when the count number of the counter j has reached "J", the control proceeds to step 3815, in which each of the counter j and the variable d is initialized to "0".

At step 3816, a luminance-value calculation routine is executed as a sub-routine. Namely, a luminance value is calculated based on any one of the object color data (step 3806) and the texture color data (step 3812), and is then set in the pixel $P_{uv}$. Note, the luminance-value calculation routine itself is well known, and the calculation of the luminance value is carried out by using a shading or highlight method so that an image can be displayed on the screen of the display unit 12 in a 3-dimensional manner.

On the other hand, at step 3804, when the viewing ray (30) does not intersect with the sphere object, the control proceeds from step 3804 to step 3817, in which a suitable background luminance color is set in the pixel $P_{uv}$. For example, the background luminance color may be blue.

In either event, at step 3818, a count number of the counter u is incremented by "1". Then, at step 3819, it is monitored whether the count number of the counter u has reached "U" (see: FIG. 11). When the count number of the counter u has not reached "U", the control returns to step 3803, in which a pixel $P_{uv}$ is again read from the bitmap memory 22, and is processed in the same manner as stated above (steps 3803 to 3819).

At step 3819, when the count number of the counter u has reached "U", the control proceeds to step 3820, in which the counter u is initialized to "0".

At step 3821, a count number of the counter v is incremented by "1". Then, at step 3822, it is monitored whether the count number of the counter v has reached "V" (see: FIG. 11). When the count number of the counter v has not reached "V", the control returns to step 3803. Namely, in which a pixel $P_{uv}$ is further read from the bitmap memory 22, and is processed in the same manner as stated above (steps 3803 to 3822).

At step 3822, when the count number of the counter v has reached "V", i.e. when the reading of all the pixels ($P_{uv}$) from the bitmap memory 22 (see: FIG. 11) has been completed, the control proceeds to step 3823, in which an image is drawn and displayed on screen of the display unit 12.

Figure 39:
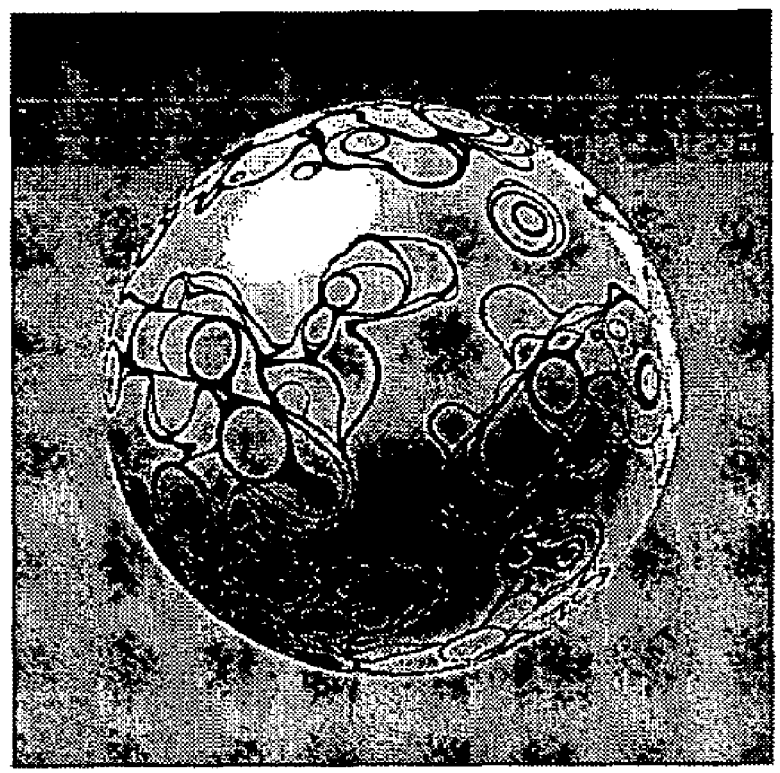
FIG. 39 is an explanatory view showing by way of example patterns which are drawn on a surface of a sphere object by the sixth metaball drawing routine of FIG. 38.

Referring to FIG. 39, an image is shown by way of example, which can be obtained by the execution of the sixth metaball drawing routine of FIG. 38. As shown in FIG. 39, the textures or patterns, which are generated by the metaball drawing method according to the present invention, are 3-dimesionally drawn on the surface of the sphere object.

Note, in the above-mentioned sixth embodiment, although only one of the threshold band THB is used, it should be understood that more than one threshold band may be set with respect to the metaballs ($M_j$).

Finally, it will be understood by those skilled in the art that the foregoing description is of preferred embodiments of the system and method, and that various changes and modifications may be made to the present invention without departing from the spirit and scope thereof.

The invention claimed is:

1. A metaball drawing system comprising:
a metaball definition system that defines first and second metaballs with respect to a screen, said respective first and second metaballs being represented by first and second density distributions;
a threshold setting system that sets a threshold band with respect to said first and second density distributions;
a first metaball determination system that determines whether a pixel on said screen is included in said first metaball;
a first density calculation system that calculates a first density at said pixel based on said first density distribution when it is determined that said pixel is included in said first metaball by said first metaball determination system;
a first threshold determination system that determines whether said first density falls within said threshold band;
a first luminance-value setting system that sets a first luminance value in said pixel based on said first density when it is determined that said first density falls within said threshold band by said first threshold determination system;
a second metaball determination system that determines whether said pixel is included in said second metaball after it is determined whether said pixel is included in said first metaball;
a second density calculation system that calculates a second density at said pixel based on a density distribution, which is combined by said first and second density distributions, when it is determined that said pixel is included in said second metaball by said second metaball determination system;
a second threshold determination system that determines whether said second density falls within said threshold band; and
a second luminance-value setting system that sets a second luminance value in said pixel based on said second density when it is determined that said second density falls within said threshold band by said second threshold determination system.

2. The metaball drawing system as set forth in claim 1, further comprising a pixel development system that develops said pixel on said screen based on any one of said first and second luminance values.

3. The metaball drawing system as set forth in claim 1, wherein any one of said first and second luminance values is set as binary data by a corresponding luminance-value setting system.

4. The metaball drawing system as set forth in claim 1, wherein any one of said first and second luminance values is set as gradation data based on a density conversion function by a corresponding luminance-value setting system.

5. The metaball drawing system as set forth in claim 1, wherein one of said first and second density distributions is defined as a negative density distribution.

6. A metaball drawing system comprising:
a metaball definition system that defines first and second metaballs with respect to a screen, said respective first and second metaballs being represented by first and second density distributions, a first set of first red data, first green data and first blue data being assigned to said first metaball, a second set of second red data, second green data and second blue data being assigned to said second metaball;
a threshold setting system that sets a threshold band with respect to said first and second density distributions;
a first metaball determination system that determines whether a pixel on said screen is included in said first metaball;
a first density calculation system that calculates a first density at said pixel based on said first density distribution when it is determined that said pixel is included in said first metaball by said first metaball determination system;

a first threshold determination system that determines whether said first density falls within said threshold band;

a first color density calculation system that calculates a first red density, a first green density and a first blue density from said first set of first red data, first green data and first blue data based on said first density when it is determined that said first density falls within said threshold band by said first threshold determination system;

a first luminance-value setting system that sets a first luminance value in said pixel based on said first red density, said first green density and said first blue density;

a second metaball determination system that determines whether said pixel is included in said second metaball after it is determined whether said pixel is included in said first metaball;

a second density calculation system that calculates a second density at said pixel based on a density distribution, which is combined by said first and second density distributions, when it is determined that said pixel is included in said second metaball by said second metaball determination system;

a second threshold determination system that determines whether said second density falls within said threshold band;

a second color density calculation system that calculates a second red density, a second green density and a second blue density from said first set of first red data, first green data and first blue data and said second set of second red data, second green data and second blue data based on said second density when it is determined that said second density falls within said threshold band by said second threshold determination system; and a second luminance-value setting system that sets a second luminance value in said pixel based on said second red density, said second green density and said second blue density.

7. The metaball drawing system as set forth in claim 6, further comprising a pixel development system that develops said pixel on said screen based on any one of said first and second luminance values.

8. A metaball drawing method performed by a metaball drawing system, comprising:

defining first and second metaballs with respect to a screen, said respective first and second metaballs being represented by first and second density distributions;

setting a threshold band with respect to said first and second density distributions;

determining whether a pixel on said screen is included in said first metaball;

calculating a first density at said pixel based on said first density distribution when it is determined that said pixel is included in said first metaball;

determining whether said first density falls within said threshold band;

setting a first luminance value in said pixel based on said first density when it is determined that said first density falls within said threshold band;

determining whether said pixel is included in said second metaball after it is determined whether said pixel is included in said first metaball;

calculating a second density at said pixel based on a density distribution, which is combined by said first and second density distributions, when it is determined that said pixel is included in said second metaball;

determining whether said second density falls within said threshold band; and setting a second luminance value in said pixel based on said second density when it is determined that said second density falls within said threshold band.

9. The metaball drawing method as set forth in claim 8, further comprising developing said pixel on said screen based on any one of said first and second luminance values.

10. The metaball drawing method as set forth in claim 8, wherein any one of said first and second luminance values is set as binary data by a corresponding luminance-value setting system.

11. The metaball drawing method as set forth in claim 8, wherein any one of said first and second luminance values is set as gradation data based on a density conversion function.

12. The metaball drawing method as set forth in claim 8, wherein one of said first and second density distributions is defined as a negative density distribution.

13. A metaball drawing method performed by a metaball drawing system, comprising:

defining first and second metaballs with respect to a screen, said respective first and second metaballs being represented by first and second density distributions, a first set of first red data, first green data and first blue data being assigned to said first metaball, a second set of second red data, second green data and second blue data being assigned to said second metaball;

setting a threshold band with respect to said first and second density distributions;

determining whether a pixel is included in said first metaball;

calculating a first density at said pixel based on said first density distribution when it is determined that said pixel is included in said first metaball;

determining whether said first density falls within said threshold band;

calculating a first red density, a first green density and a first blue density from said first set of first red data, first green data and first blue data based on said first density when it is determined that said first density falls within said threshold band;

setting a first luminance value in said pixel based on said first red density, first green density and first blue density;

determining whether said pixel is included in said second metaball after it is determined whether said pixel is included in said first metaball;

calculating a second density at said pixel based on a density distribution, which is combined by said first and second density distributions, when it is determined that said pixel is included in said second metaball;

determining whether said second density falls within said threshold band;

calculating a second red density, a second green density and a second blue density from said first set of first red data, first green data and first blue data and said second set of second red data, second green data and second blue data based on said second density when it is determined that said second density falls within said threshold band; and setting a second luminance value in said pixel based on said second red density, second green density and second blue density.

14. The metaball drawing method as set forth in claim 13, further comprising developing said pixel on said screen based on any one of said first and second luminance values.

15. A memory medium storing a metaball drawing program, which when executed by a system control unit, performs procedures comprising:

a procedure of defining first and second metaballs with respect to a screen, said respective first and second metaballs being represented by first and second density distributions;

a procedure of setting a threshold band with respect to said first and second density distributions;

a procedure of determining whether a pixel on said screen is included in said first metaball;

a procedure of calculating a first density at said pixel based on said first density distribution when it is determined that said pixel is included in said first metaball;

a procedure of determining whether said first density falls within said threshold band;

a procedure of setting a first luminance value in said pixel based on said first density when it is determined that said first density falls within said threshold band;

a procedure of determining whether said pixel is included in said second metaball after it is determined whether said pixel is included in said first metaball;

a procedure of calculating a second density at said pixel based on a density distribution, which is combined by said first and second density distributions, when it is determined that said pixel is included in said second metaball;

a procedure of determining whether said second density falls within said threshold band; and a procedure of setting a second luminance value in said pixel based on said second density when it is determined that said second density falls within said threshold band.

16. The memory medium as set forth in claim 15, wherein said metaball drawing program further comprising a procedure of developing said pixel on said screen based on any one of said first and second luminance values.

17. A memory medium storing a metaball drawing program, which when executed by a system control unit, performs procedures comprising:

a procedure of defining first and second metaballs with respect to a screen, said respective first and second metaballs being represented by first and second density distributions, a first set of first red data, first green data and first blue data being assigned to said first metaball, a second set of second red data, second green data and second blue data being assigned to said second metaball;

a procedure of setting a threshold band with respect to said first and second density distributions;

a procedure of determining whether a pixel is included in said first metaball;

a procedure of calculating a first density at said pixel based on said first density distribution when it is determined that said pixel is included in said first metaball;

a procedure of determining whether said first density falls within said threshold band;

a procedure of calculating a first red density, a first green density and a first blue density from said first set of first red data, first green data and first blue data based on said first density when it is determined that said first density falls within said threshold band;

a procedure of setting a first luminance value in said pixel based on said first red density, green density and blue density;

a procedure of determining whether said pixel is included in said second metaball after it is determined whether said pixel is included in said first metaball;

a procedure of calculating a second density at said pixel based on a density distribution, which is combined by said first and second density distributions, when it is determined that said pixel is included in said second metaball;

a procedure of determining whether said second density falls within said threshold band;

a procedure of calculating a second red density, a green density and a blue density at said pixel from said first set of first red data, first green data and first blue data and said second set of second red data, second green data and second blue data based on said second density when it is determined that said second density falls within said threshold band; and a procedure of setting a second luminance value in said pixel based on said second red density, second green density and second blue density.

18. The memory medium as set forth in claim 17, wherein said metaball drawing program further comprising a procedure of developing said pixel on said screen based on any one of said first and second luminance values.

* * * * *